US012799385B2

(12) United States Patent
Archambeau et al.

(10) Patent No.: US 12,799,385 B2
(45) Date of Patent: Nov. 17, 2026

(54) ELECTROCHROMIC SOLUTION

(71) Applicant: Essilor International, Charenton-le-pont (FR)

(72) Inventors: Samuel Archambeau, Charenton-le-Pont (FR); Claudine Biver, Charenton-le-pont (FR); Fabien Berit Debat, Charenton-le-pont (FR); Jerôme Ballet, Charenton-le-pont (FR); Jean-Paul Cano, Charenton-le-pont (FR)

(73) Assignee: Essilor International, Charenton-le-Pont (FR)

( * ) Notice: Subject to any disclaimer, the term of this patent is extended or adjusted under 35 U.S.C. 154(b) by 254 days.

(21) Appl. No.: 18/001,199

(22) PCT Filed: Jun. 9, 2021

(86) PCT No.: PCT/EP2021/065503

§ 371 (c)(1),
(2) Date: Dec. 8, 2022

(87) PCT Pub. No.: WO2021/250114

PCT Pub. Date: Dec. 16, 2021

(65) Prior Publication Data

US 2023/0220274 A1 Jul. 13, 2023

(30) Foreign Application Priority Data

Jun. 12, 2020 (EP) .................................... 20305643

(51) Int. Cl.
*C09K 9/02* (2006.01)
*G02F 1/1503* (2019.01)
*G02F 1/1516* (2019.01)
*G02F 1/1523* (2019.01)

(52) U.S. Cl.
CPC .............. *C09K 9/02* (2013.01); *G02F 1/1503* (2019.01); *G02F 1/1516* (2019.01); *G02F 1/1525* (2013.01); *G02F 2001/1518* (2019.01)

(58) Field of Classification Search
CPC ....... C09K 9/02; G02F 1/1503; G02F 1/1516; G02F 1/1525; G02F 2001/1518
See application file for complete search history.

(56) References Cited

U.S. PATENT DOCUMENTS 5,142,407 A 8/1992 Varaprasad et al.
5,145,609 A 9/1992 Varaprasad et al.
6,525,861 B1 2/2003 Roberts et al.
10,377,152 B1 * 8/2019 Wu .......................... B41J 11/02
2003/0165000 A1 9/2003 Roberts et al.
2005/0012079 A1 * 1/2005 Roberts ................. G02F 1/1503 252/500
2010/0166946 A1 7/2010 Kokeguchi
2011/0211245 A1 9/2011 Duluard et al.
2012/0307338 A1 * 12/2012 Solarski .................. C09K 9/02 428/221
2012/0307340 A1 12/2012 Archambeau et al.
2016/0266460 A1 * 9/2016 Kloeppner ............ G02F 1/1533
2017/0307952 A1 10/2017 Ash et al.
2019/0106562 A1 * 4/2019 Thuresson .............. B29C 67/04

FOREIGN PATENT DOCUMENTS

EP 2848667 A1 3/2015
EP 2848668 A1 3/2015
EP 2848669 A1 3/2015
EP 2848670 A1 3/2015
EP 3115433 A1 1/2017
EP 3345981 A1 7/2018
FR 2937154 A1 4/2010
FR 2950710 A1 4/2011
JP 2010-85568 A 4/2010
JP 2010085568 A * 4/2010 ............... G02F 1/15
WO WO-02075441 A2 * 9/2002 ............ G02F 1/176
WO WO 2006/013250 A1 2/2006

OTHER PUBLICATIONS

International Search Report mailed on Sep. 9, 2021 in PCT/EP2021/065503 filed on Jun. 9, 2021 (3 pages).

* cited by examiner

*Primary Examiner* — Bijan Ahvazi

(74) *Attorney, Agent, or Firm* — Oblon, McClelland, Maier & Neustadt, L.L.P.

(57) ABSTRACT

The present invention relates to an electrochromic solution and a use thereof, wherein the said solution comprises: a solvent; a thickening polymer agent having a molecular weight of at least 50,000 g/mol, preferably 200,000 g/mol, more preferably of at least 250,000 g/mol; at least an additive having a molecular weight between 300 and 50,000 g/mol, preferably between 320 and 20,000 g/mol; a redox chemical mixture in solution in said solvent said mixture being constituted of at least one electrochromic reducing compound and at least one electrochromic oxidizing compound, and which colors in the presence of an applied voltage and which bleaches to a colorless condition in the absence of an applied voltage. The invention further relates to a device comprising said solution.

19 Claims, No Drawings

ELECTROCHROMIC SOLUTION

The present invention relates to a novel electrochromic solution comprising a thickening polymer agent having a molecular weight of at least 50,000 g/mol and at least an additive and to the use of such solution as a variable transmittance medium for the manufacture of an optical article, such as optical lenses, optical filters, attenuators, windows, visors, goggles, mirrors and displays.

Electrochromism is a well-known physical phenomenon which is observed with certain classes of chemical compounds that change reversibly colour when a voltage is applied to them. The material undergoes reversible changes in optical properties by oxidation and reduction. Such redox reactions of the compounds provide the "self-erasing" feature to a device. Usually, the electrochromic material may be colourless when an electric field is not applied and may be coloured when an electric field is applied. An electrochromic device, i.e. device containing electrochromic compounds, the absorbance of which depends only on the presence of electric field, can thus have two states, a coloured state (when electrically activated) and a bleached state (in the inactive state). The optical transmission properties of the device depend on the electrochromic compounds.

Electrochromic systems may be applied to various applications. For instance, in the ophthalmic field, electrochromic lenses may enable the user to actively control the darkening of the lens under some illumination conditions, so as to provide ocular protection, and commute rapidly when these conditions change, contrary to photochromic lenses which passively darken under UV radiation and furthermore require some time to bleach again when the UV radiation stops. Moreover, photochromic dyes are usually incorporated into ophthalmic lenses by an imbibition (or impregnation) process which is not suited for any ophthalmic substrate. Electrochromic glasses have also been used in the manufacture of "smart windows" or rear-view mirrors. Usually, all these electrochromic devices are made from an electrochromic composition comprising, besides electrochromic compounds, a solvent. This is referred to as an electrochromic solution.

In the case of electrochromic self-erasing solutions, there are two issues that need to be managed: coloration segregation and current leakage.

The coloration segregation problem emerges from the continuous operation of the electrochromic system for long periods of time. When first bleached by removal of the electrical energy after prolonged operation or coloration, bleaching in the device is often non-uniform. This issue is visually perceived in the form of segregated colored bands that are slow to dissipate near the transparent electrical elements present within the electrochromic system. The segregation is thus due to migration and convection of the coloring species which remain adjacent to said electrical elements. The appearance of such colored bands is unacceptable from an aesthetic, commercial and functional point of view since the definition of the visual information gathered by the user from a device containing the electrochromic system is impaired.

Differences in solubility between the colored and uncolored forms of any of the coloring species may also contribute to segregation. This form of segregation is particularly noticeable in electrochromic devices whose major plane is non-horizontal when in use such as is experienced with rearview mirrors on automobiles, wall mirrors, building windows, automotive front, rear and side windows, optical lenses, eye glasses and the like. In their colored form, either or both of the coloring species may fully or partially phase separate of the electrochromic solution depending on their solubilities, and may float or sink according to their densities relative to that of the host solvent.

Yet another problem encountered in electrochromic self-erasing devices relates to current leakage. When the electrochromic cell is colored by the application of voltage, the colored species of the redox pair continually tend to recombine and return to their equilibrium, which is the colorless condition. The rate of recombination of the colored species within the bulk of the solution is linked to their diffusion coefficient in the solvent used. In order to compensate for the tendency of the colored species to recombine and go to the colorless equilibrium state, current must continually leak into the electrochromic solution via the conductive electrodes that typically sandwich said solution.

Because current must flow across the conductive surface of the transparent electrical elements used on at least one of the substrates that sandwich the electrochromic cell, and because these transparent electrical elements have finite sheet resistance, applied potential will be highest adjacent to the connectors typically located at an edge perimeter of the cell and will be lowest near the center of the device as current passes across the conductive glass surface to color remote regions.

Thus, if the leakage current is high, the potential drop that ensues across the transparent conductor itself results in a lower potential being applied to remote regions. Coloration is therefore non-uniform. The edge regions nearest the electrical elements color deepest and the central regions color lightest. Such a coloration gradient is not acceptable and there is therefore a need to ensure that deep coloring is uniform throughout the solution.

Furthermore, the leakage current needs to be as low as possible so that the current consumption also becomes as low as possible. A low current consumption is of great importance due to the small size of the battery used in a device to supply the electrochromic system. In case of ophthalmic lenses, this battery has to be as small as possible for both cosmetic and ergonomic considerations.

However, a low leakage current has an incidence on the bleaching rate. The bleaching rate is the time an electrochromic device takes to return from the full or partial colored state to the substantially clear, uncolored state. Lowering the leakage current leads to a concomitant slowing of the bleach rate, which is also unacceptable from a commercial point of view.

In order to achieve the above-mentioned commercially desired devices, there is a need to strike a balance between depth of coloration, coloration uniformity and a relatively rapid bleach rate.

While the addition of only one thickening agents such as polymethylmethacrylate (PMMA) might be effective in that it increases the viscosity of the electrochromic solution and helps reduce segregation, such agents are known to be disadvantageous because they lower the current leakage and, simultaneously decrease the bleach rate. One problem with adding only one thickener is that the solution can become so viscous that process to make an electrochromic device becomes industrially unfeasible Document U.S. Pat. No. 5,145,609 describes an electrochromic solution containing a polyether polymer in a propylene carbonate solvent. It was found that adding a linear polyether polymer such as polyethylene oxide (PEO) instead of a polymethylmethacrylate (PMMA), segregation effects may be removed with a limited decrease of the leakage current, and thus a limited increase of the bleaching rate.

However, neither of these polymers shows a satisfactory solubility in a propylene carbonate solvent. While low molecular weight PEO is not soluble in propylene carbonate, PMMA may be soluble but solubilization takes a long time at room temperature, rendering them both not attractive.

Document U.S. Pat. No. 5,142,407 describes an electrochromic solution containing cyanoethylsucrose in a propylene carbonate solvent. By replacing polymethylmethacrylate with cyanoethylsucrose, whose solubility in propylene carbonate is higher, there is an improvement in uniformity of coloration, a decrease in segregation and a limited decrease of the leakage current.

However, the viscosity of electrochromic solutions obtained according to this document is generally less than 100 centiStokes (cSt) measured at 25° C., such value being too low to completely avoid the segregation effect. Furthermore, cyanoethylsucrose is a yellow-colored liquid, making it unsuitable for the production of transparent articles.

There is thus a need for obtaining improved electrochromic solutions in order to be used as transparent homogenous media for forming high quality articles, in particular high quality ophthalmic lenses, wherein said solutions show a low segregation effect on the one side as well as a rather high bleaching rate and low leakage current obtained from a low recombination of the colored species within the bulk of the solution on the other side, and wherein these solutions are sufficiently viscous, preferably showing a viscosity of less than 3000 cP at 25° C., rendering the obtained solution suitable for the production of electrochromic devices.

After concluding extensive research, according to a first aspect, the present inventors provide an electrochromic solution comprising:

- a solvent;
- a thickening polymer agent having a molecular weight of at least 50,000 g/mol, preferably of at least 200,000 g/mol, more preferably of at least 250,000 g/mol;
- at least an additive having a molecular weight between 300 and 50,000 g/mol, preferably between 320 and 20,000 g/mol; preferably said additive being in liquid state;
- a redox chemical mixture in solution in said solvent said mixture being constituted of at least one electrochromic reducing compound and at least one electrochromic oxidizing compound, and which colors in the presence of an applied voltage and which bleaches to a colorless condition in the absence of an applied voltage.

The simultaneous use of such thickening agent together with at least an additional additive within the electrochromic solution helps reduce the segregation effect while keeping the viscosity less than 3000 cP at 25° C.

While the use of a high molecular weight compound (i.e. the thickening polymer agent) helps avoid the phase separation problems, the use of a low molecular weight compound (i.e. the additive) helps manage the current consumption problems.

The solvent used in the electrochromic solution according to the invention is an inert solvent selected from, but not limited to ethylene carbonate, propylene carbonate, γ-butyrolactone, γ-valerolactone, acetronitrile, propionitrile, benzonitrile, glutaronitrile, methylglutaronitrile, dimethylformamide, N-methylpyrrolidone, sulfolane, 3-methyl sulfolane, methyl propionate, ethylene glycol, ethylene carbonate, propylene glycol diacetate, propylene glycol methyl ether acetate, ionic liquids, and mixtures thereof. Preferably the solvent is propylene carbonate.

The present invention relates more particularly to an electrochromic solution wherein the thickening polymer agent is electrochemically inert and soluble in the solvent used. The thickening polymer agent useful for the present invention has a molecular weight of at least 50,000 g/mol, preferably of at least 200,000 g/mol, more preferably of at least 250,000 g/mol and of at most 1,000,000 g/mol, preferably at most 800,000 g/mol, more preferably of at most 650,000 g/mol.

Preferably, the thickening polymer agent is a vinyl acetate polymer, said vinyl acetate polymer having a molecular weight of at least 50,000 g/mol, preferably of at least 200,000 g/mol, more preferably of at least 250,000 g/mol, preferably of at least 300,000 g/mol, more preferably of at least 350,000 g/mol, even more preferably of at least 400,000 g/mol and of at most 1,000,000 g/mol, preferably at most 800,000 g/mol, more preferably of at most 650,000 g/mol.

More preferably, the solvent is propylene carbonate and the thickening polymer agent is a vinyl acetate polymer having a molecular weight of at least 200,000 g/mol, preferably of at least 250,000 g/mol.

One preferred example of thickening polymer useful for the present invention is the vinyl acetate polymer (PVAC or Polyvinyl acetate) sold under the name Vinnapas UW25FS sold by Wacker having a molecular weight of 540,000 g/mol measured by Size Exclusion Chromatography (SEC).

The electrochromic solution further comprises an additive chosen from an ester derivative of benzoic acid or an ester derivative of phthalic acid or a mixture thereof.

As in the case of the thickening polymer agent, the additive also has to be soluble in the solvent used and electrochemically inert, preferably with an electrochemical window higher than 2V.

The molecular weight of the additive is between 300 and 50,000 g/mol. Preferably its molecular weight is higher than 400 g/mol. It has been observed that an additive having a molecular weight higher than 300 g/mol is efficient for reducing leakage current.

Preferably its molecular weight is lower than 20,000 g/mol, lower than 18,000 g/mol, even more preferably lower than 15,000 g/mol or even more lower than 10,000 g/mol.

The additive may be in the liquid or solid form. Preferably, the additive is in the liquid form.

According to an embodiment, the additive is chosen from an ester derivative of benzoic acid of formula (I) or (II)

(I)

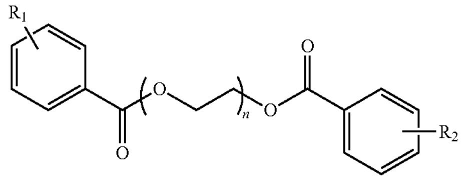

(II)

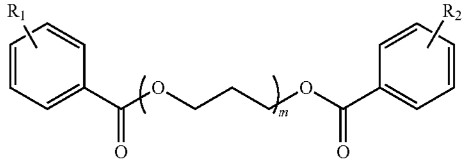

$R_1$ and $R_2$ are similar or different and are selected from H, optionally substituted alkyl (such as optionally substituted arylalkyl), optionally substituted aryl, and optionally substituted cycloalkyl.

The groups or radicals defined hereinabove may be substituted by one or more substituents such as, for example, halogen, alkyl, alkoxy, aryl, heteroaryl, haloalkyl, haloalkoxy, alkoxycarbonyl, alkanoyl, aroyl, formyl, nitrile, nitro, amido, alkylthio, alkylsulfinyl, alkylsulfonyl, arylthio, arylsulfinyl, arylsulfonyl, amino, alkylamino, arylamino, dialkylamino and diarylamino.

The expression "alkyl" represents any monovalent radical of a linear or branched hydrocarbon chain comprising 1 to 18 carbon atoms. Examples of C1-C18 alkyl groups include C1-C4 alkyl groups such as methyl, ethyl, n-propyl, i-propyl, n-butyl, i-butyl, s-butyl or t-butyl, C6-C8 alkyl groups such as n-hexyl, n-heptyl or n-octyl, as well as n-pentyl, 2-ethylhexyl, 3,5,5-trimethylhexyl, n-nonyl, n-decyl, n-undecyl, n-dodecyl or n-octadecyl.

The expression "cycloalkyl" represents any monovalent radical of a monocycle or bicyclic 3 to 12 membered saturated carbocycle. Examples of C3-C12 cycloalkyl groups include cyclopropyl, cyclopentyl and cyclohexyl.

The expression "aryl" represents any monovalent radical of an aromatic hydrocarbon comprising 6 to 18 carbon atoms. Examples of C6-C18 aryl groups include phenyl, naphthyl, anthracenyl and phenanthrenyl.

The expression "arylalkyl" represents for instance benzyl or phenyl (C2-C7 alkyl).

Preferably both $R_1$ and $R_2$ are hydrogen atoms.

In the above-mentioned formula (I), n is an integer ranging from 1 to 10, preferably from 1 to 7, more preferably from 1 to 4.

In the above-mentioned formula (II), m is an integer ranging from 1 to 10, preferably from 1 to 7, more preferably from 1 to 4.

Still in this embodiment, the additive is preferably selected from a list of ester derivatives of benzoic acid consisting of polypropylene glycol dibenzoate (PPGDB) such as dipropylene glycol dibenzoate (DPGDB) and tripropylene glycol dibenzoate (TPGDB), polyethylene glycol dibenzoate (PEGDB) such as diethylene glycol dibenzoate (DEGDB) and triethylene glycol dibenzoate (TEGDB) and mixture thereof.

The dipropylene glycol dibenzoate (DPGDB) that may advantageously be used is for example the one sold under the name Plaxter B271 by COIM.

The polyethylene glycol dibenzoate (PEGDB) that may advantageously be used is for example the one sold by Sigma Aldrich having a molecular weight of 410 g/mol and a boiling point of 217° C. Compounds containing a glycol unit and an aromatic unit are particularly advantageous. The glycol unit helps increase the solubility of the additive in the solvent used and the presence of the aromatic unit helps increase the boiling point.

Alternatively, the additive can be selected from a list of ester derivatives of phthalic acid consisting of bis (2-ethylhexyl phthalate) (DEHP), diisononyl phthalate (DINP), di n-octyl phthalate (DNOP), diisodecyl phthalate (DIDP), dipropylheptyl phthalate (DPHP), di-2-ethylhexyl terephthalate (DOTP or DEHT) and mixture thereof.

In another embodiment, the additive can be selected from a list of glycol derivatives such as polyethylene glycol diacrylate (or methacrylate), polyethylene glycol diepoxy, polypropylene glycol diacrylate (or methacrylate), polypropylene glycol diepoxy and mixture thereof, provided that the molecular weight of said additive is between 300 and 50,000 g/mol.

Alternatively, the additive can be selected from a list of low molecular weight polymers (<50,000) such as Poly (methyl methacrylate) (PMMA), Polyvinyl acetate (PVA, PVAc, PVAC or poly(ethenyl ethanoate), Polyvinyl butyral (PVB), Cellulose acetate butyrate (CAB) and mixture thereof, provided that the molecular weight of said additive is between 300 and 50,000 g/mol.

According to an embodiment, the electrochromic solution may comprise at least two additives independently chosen from one of the above-mentioned ester derivatives of benzoic acid, one of the above-mentioned ester derivatives of phthalic acid, one of the above-mentioned glycol derivatives or one of the above-mentioned low molecular weight polymers, such as for example a mixture of one derivative of benzoic acid and one glycol derivative, a mixture of at least two ester derivatives, or a mixture of at least two glycol derivatives, provided the at least two additives are well miscible.

The content of the additive is from 5 to 60 wt %, preferably from 10 to 30 wt %, more preferably from 15 to 25 wt % by weight relative to the total weight of the electrochromic solution.

The content of the thickening polymer agent is from 1 to 30 wt %, preferably from 3 to 20 wt %, more preferably from 5 to 15 wt % by weight relative to the total weight of the electrochromic solution.

The viscosity of said electrochromic solution is not greater than 3000 cP at 25° C., preferably not greater than 2500 cP at 25° C., even more, preferably less than 2000 cP at 25° C. A too high a viscosity is not desirable since it leads to longer filling processes of the electrochromic solution within the end device, which is not desirable from an industrial point of view.

It is thus preferable to keep the solid content of the electrochromic solution (i.e thickening polymer, additive, electrochromic compounds) as low as possible, preferably less than 45 weight (wt %) relative to the total weight of the solution, even more preferably less than 30 wt % relative to the total weight of the solution.

In a preferred embodiment, the electrochromic solution is liquid. For the same reason, as mentioned above, liquid additives are preferred.

Another factor that influences the length of the said filing processes is the melting point of the electrochromic solution. In order to avoid long filling processes, the melting point of the solution needs to be kept at less than −20° C.

According to a preferred embodiment, the thickening polymer agent is a vinyl acetate polymer present from 5 to 15 wt % by weight relative to the total weight of the electrochromic solution and the additive is polypropylene glycol dibenzoate or polyethylene glycol dibenzoate present from 15 to 25 wt % by weight relative to the total weight of the electrochromic solution.

The at least one reducing compound of the solution of the present invention is not particularly limited. The at least one reducing compound is not necessarily an electrochromic compound; however, it should be chosen among compounds having at least the following properties: low absorption of visible light in the bleached state (if the reducing compound is also an electrochromic compound), good stability, in particular to oxygen, and good solubility in conventional electrochromic solvents such as propylene carbonate.

Preferably, the at least one electrochromic reducing compound is selected from ferrocene and their derivatives such as ethyl ferrocene, t-butyl ferrocene, phenoxazine and their derivatives, such as N-benzylphenoxazine, phenazine and their derivatives, such as 5,10-dihydrophenazine, N,N,N',N'-tetramethyl-p-phenylenediamine, phenothiazine and their derivatives, such as 10-methylphenothiazine and isopropylphenothiazine; thioanthrene; and tetrathiafulvalene. Preferably, the electrochromic reducing compound is 10-methylphenothiazine.

The at least one electrochromic oxidizing compound of the solution of the present invention is not particularly limited. The at least one electrochromic oxidizing compound is selected from mono viologens or bis viologens (i.e 4,4'-bipyridinium salts or bis[4,4'-bipyridinium] salts) such alkylviologens, arylviologens, arylalkylviologens, alkylarylviologens, or anthraquinones and derivatives thereof.

Non limiting examples of such viologen compounds or viologen derivatives, more particularly examples of substituted dialkyl, diaryl 4,4'-bipyridinium salts, substituted dialkyl, diaryl bis[4,4'-bipyridinium] salts and mixtures thereof are described in documents EP2848667A1, EP2848668A1, EP2848669A1, EP2848670A1, EP3115433A1 and EP3345981A1 whose teachings are incorporated herein. Preferred examples are mentioned herein.

The at least one electrochromic oxidizing compound may be ethylviologen diperchlorate.

In one preferred embodiment, the electrochromic solution comprises at least one reducing compound, preferably one reducing compound (such as 10-methylphenothiazine) and at least one electrochromic oxidizing compound, preferably at least two electrochromic oxidizing compounds, for example two or three electrochromic oxidizing compounds, preferably each electrochromic oxidizing compound being independently selected from substituted dialkyl 4,4'-bipyridinium salts, substituted diaryl 4,4'-bipyridinium salts, substituted dialkyl bis[4,4'-bipyridinium] salts or substituted diaryl bis[4,4'-bipyridinium] salts, more preferably the at least two electrochromic oxidizing compounds being at least a substituted diaryl 4,4'-bipyridinium and at least a substituted diaryl bis[4,4'-bipyridinium].

Preferably, the at least one oxidizing compound is selected or the at least two electrochromic oxidizing compounds are independently selected from the series of the following compounds.

| Compound | Formula |
| --- | --- |
| I-1 | 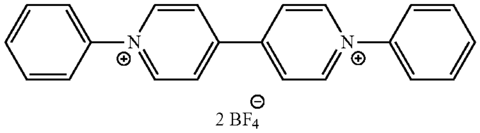 |
| I-2 | 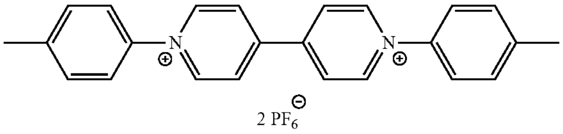 |
| I-3 | 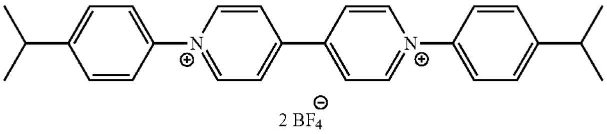 |
| I-4 | 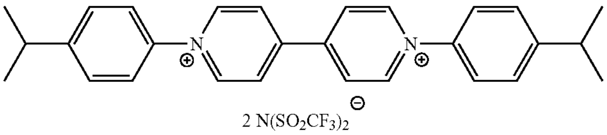 [SMILES: CC(C)c1ccc(-[n+]2ccc(-c3cc[n+](-c4ccc(C(C)C)cc4)cc3)cc2)cc1] |
| I-5 | 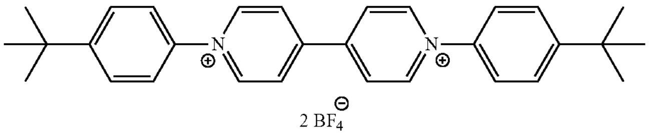 |
| I-6 | 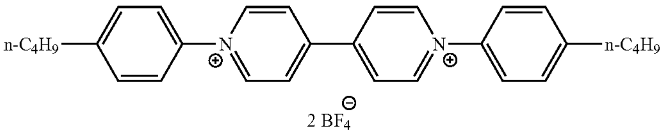 |
| I-7 | 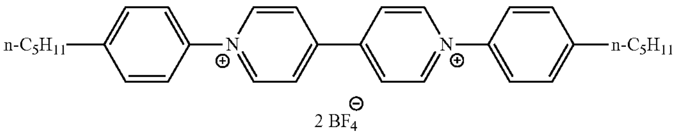 |

-continued
| Compound | Formula |
| --- | --- |
| I-8 | 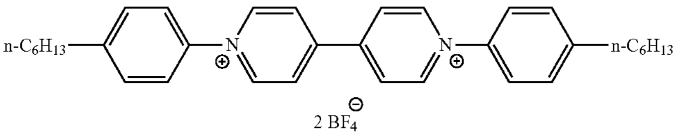 |
| I-9 | 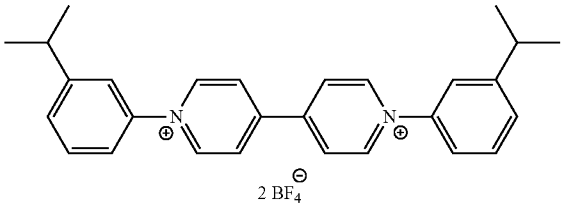 [SMILES: CC(C)c1cccc(-[n+]2ccc(-c3cc[n+](-c4cccc(C(C)C)c4)cc3)cc2)c1] |
| I-10 | 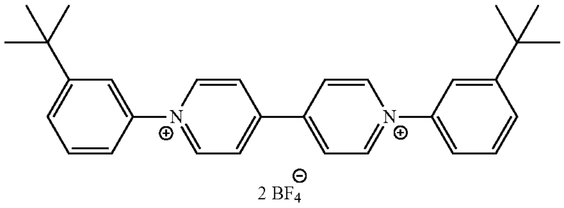 [SMILES: CC(C)(C)c1cccc(-[n+]2ccc(-c3cc[n+](-c4cccc(C(C)(C)C)c4)cc3)cc2)c1] |
| I-11 | 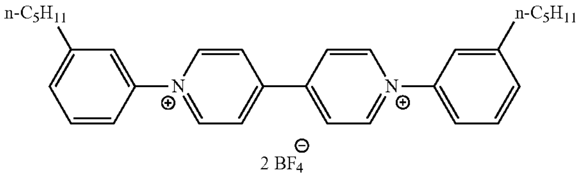 |
| I-12 | 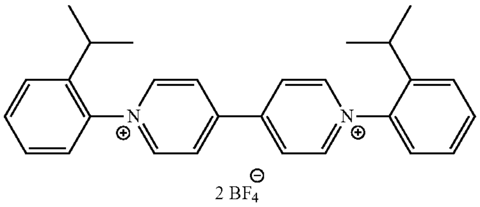 |
| I-13 | 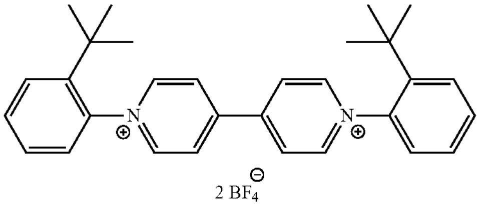 |
| I-14 | 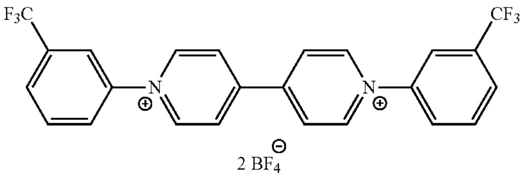 |

-continued
| Compound | Formula |
| --- | --- |
| I-15 | 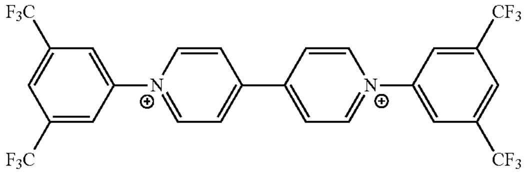 2 $BF_4^{\ominus}$ |
| I-16 | 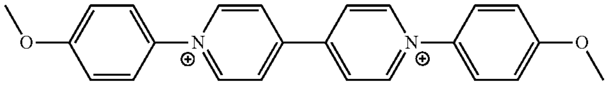 2 $PF_6^{\ominus}$ |
| I-17 | 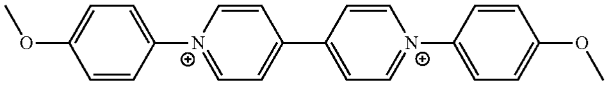 2 $ClO_4^{\ominus}$ |
| I-18 | 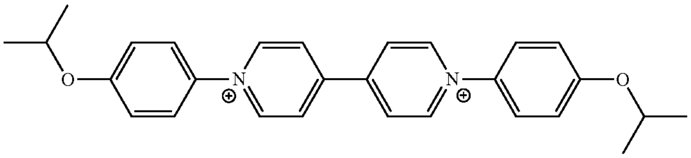 2 $BF_4^{\ominus}$ |
| I-19 | 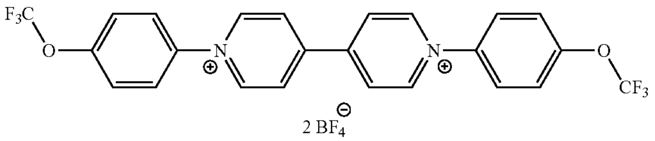 [SMILES: FC(F)(F)Oc1ccc(-[n+]2ccc(-c3cc[n+](-c4ccc(OC(F)(F)F)cc4)cc3)cc2)cc1] 2 $BF_4^{\ominus}$ |
| I-20 | 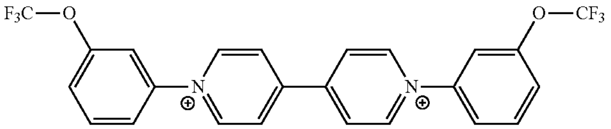 2 $BF_4^{\ominus}$ |
| I-21 | 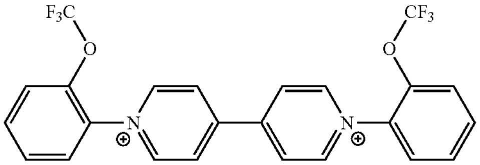 2 $BF_4^{\ominus}$ |
| I-22 | 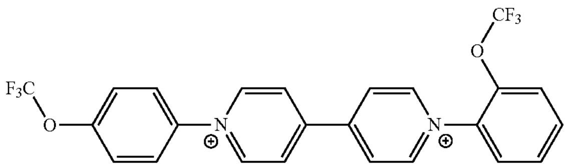 2 $BF_4^{\ominus}$ |

-continued
| Compound | Formula |
| --- | --- |
| I-23 | 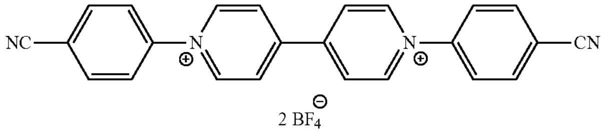 |
| I-24 | 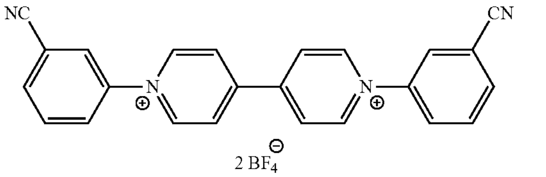 |
| I-25 | 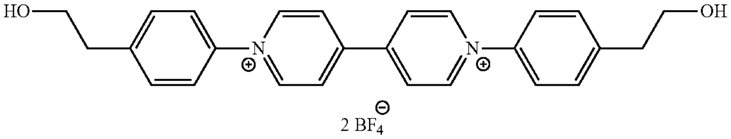 [SMILES: OCCc1ccc(-[n+]2ccc(-c3cc[n+](-c4ccc(CCO)cc4)cc3)cc2)cc1] |
| I-26 | 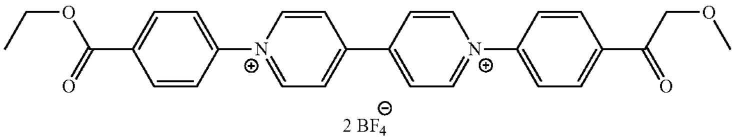 [SMILES: CCOC(=O)c1ccc(-[n+]2ccc(-c3cc[n+](-c4ccc(C(=O)COC)cc4)cc3)cc2)cc1] |
| I-27 | 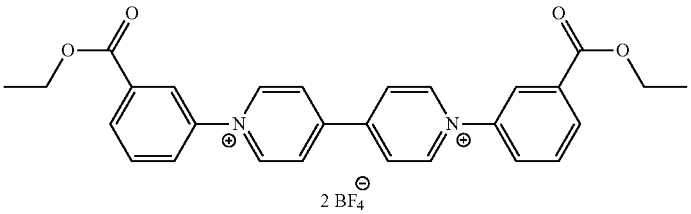 |
| I-28 | 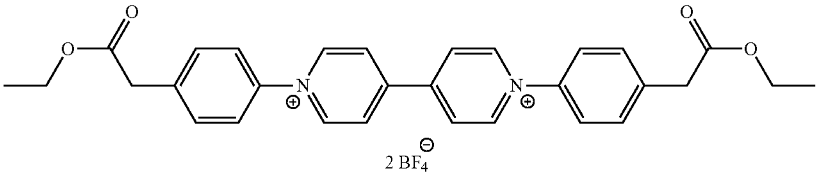 |
| I-29 | 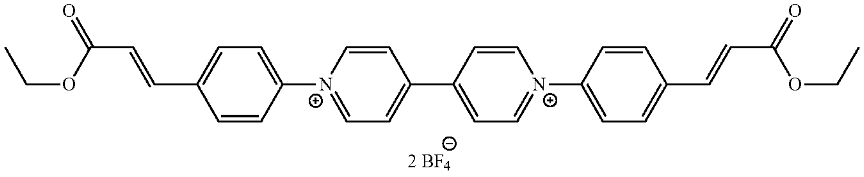 [SMILES: CCOC(=O)/C=C/c1ccc(-[n+]2ccc(-c3cc[n+](-c4ccc(/C=C/C(=O)OCC)cc4)cc3)cc2)cc1] |
| I-30 | 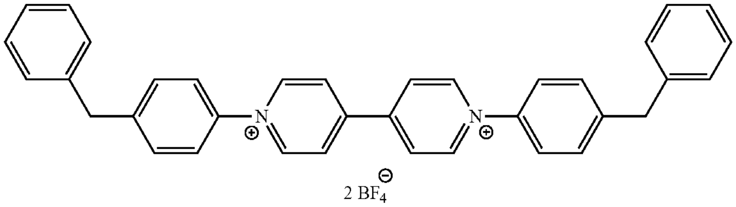 [SMILES: c1ccc(Cc2ccc(-[n+]3ccc(-c4cc[n+](-c5ccc(Cc6ccccc6)cc5)cc4)cc3)cc2)cc1] |

-continued
| Compound | Formula |
|---|---|
| I-31 | 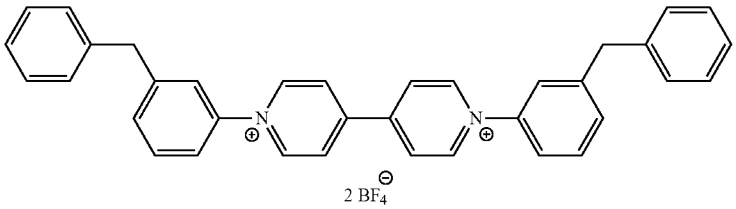 [SMILES: c1ccc(Cc2cccc(-[n+]3ccc(-c4cc[n+](-c5cccc(Cc6ccccc6)c5)cc4)cc3)c2)cc1] |
| I-32 | 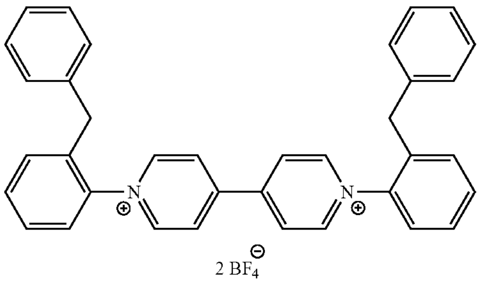 [SMILES: c1ccc(Cc2ccccc2-[n+]2ccc(-c3cc[n+](-c4ccccc4Cc4ccccc4)cc3)cc2)cc1] |
| I-33 | 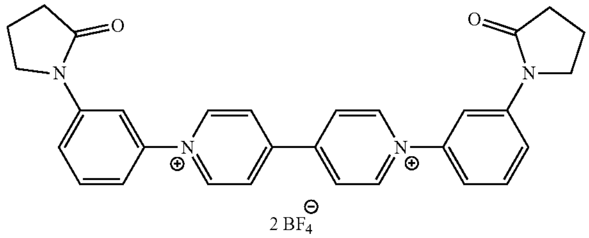 [SMILES: O=C1CCCN1c1cccc(-[n+]2ccc(-c3cc[n+](-c4cccc(N5CCCC5=O)c4)cc3)cc2)c1] |
| I-34 | 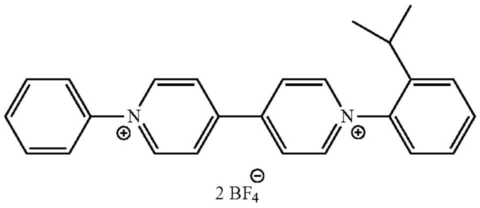 |
| I-35 | 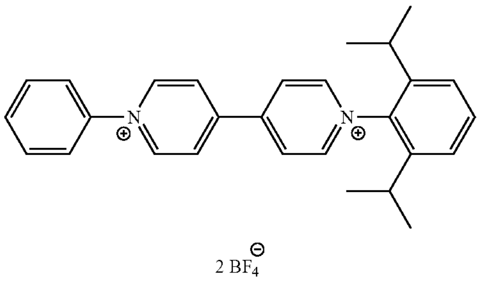 [SMILES: CC(C)c1cccc(C(C)C)c1-[n+]1ccc(-c2cc[n+](-c3ccccc3)cc2)cc1] |
| I-36 | 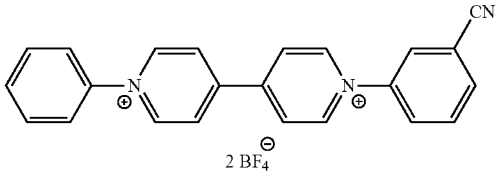 [SMILES: N#Cc1cccc(-[n+]2ccc(-c3cc[n+](-c4ccccc4)cc3)cc2)c1] |

-continued
| Compound | Formula |
| --- | --- |
| I-37 | 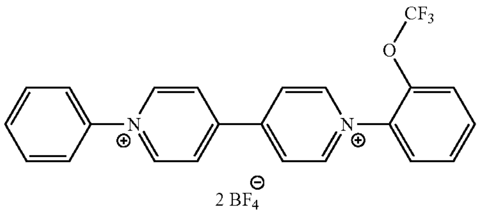 [SMILES: FC(F)(F)Oc1ccccc1-[n+]1ccc(-c2cc[n+](-c3ccccc3)cc2)cc1] |
| I-38 | 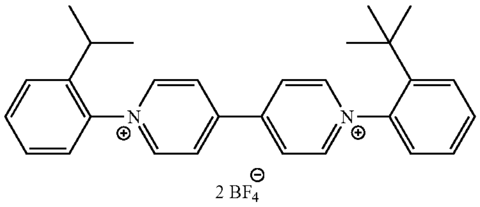 [SMILES: CC(C)c1ccccc1-[n+]1ccc(-c2cc[n+](-c3ccccc3C(C)(C)C)cc2)cc1] |
| I-39 | 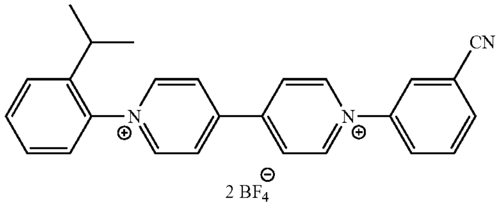 [SMILES: CC(C)c1ccccc1-[n+]1ccc(-c2cc[n+](-c3cccc(C#N)c3)cc2)cc1] |
| I-40 | 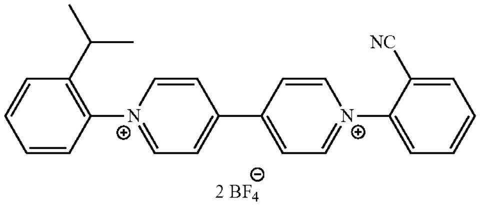 [SMILES: CC(C)c1ccccc1-[n+]1ccc(-c2cc[n+](-c3ccccc3C#N)cc2)cc1] |
| I-41 | 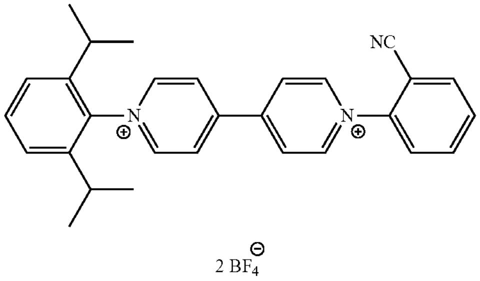 [SMILES: CC(C)c1cccc(C(C)C)c1-[n+]1ccc(-c2cc[n+](-c3ccccc3C#N)cc2)cc1] |
| I-42 | 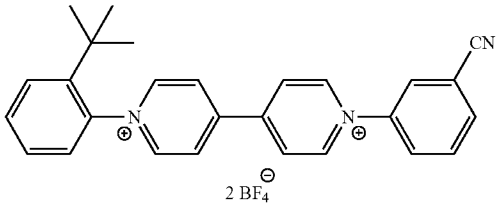 [SMILES: CC(C)(C)c1ccccc1-[n+]1ccc(-c2cc[n+](-c3cccc(C#N)c3)cc2)cc1] |

-continued
| Compound | Formula |
| --- | --- |
| I-43 | 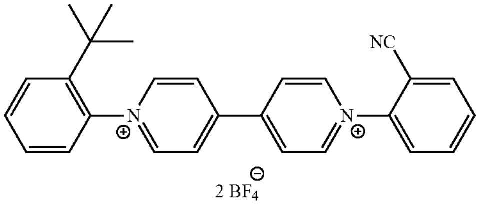 [SMILES: CC(C)(C)c1ccccc1-[n+]1ccc(-c2cc[n+](-c3ccccc3C#N)cc2)cc1] |
| I-44 | 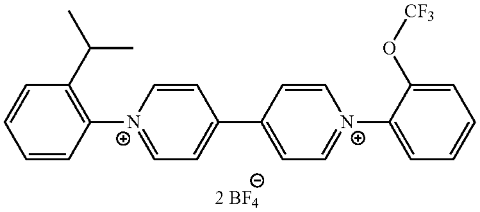 [SMILES: CC(C)c1ccccc1-[n+]1ccc(-c2cc[n+](-c3ccccc3OC(F)(F)F)cc2)cc1] |
| I-45 | 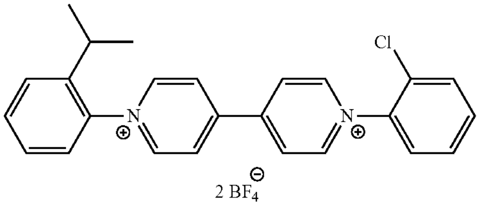 [SMILES: CC(C)c1ccccc1-[n+]1ccc(-c2cc[n+](-c3ccccc3Cl)cc2)cc1] |
| I-46 | 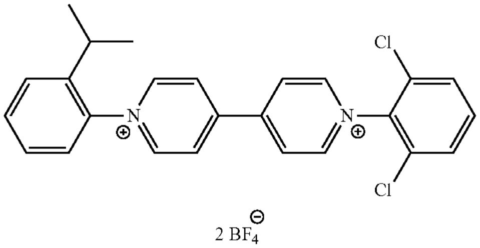 [SMILES: CC(C)c1ccccc1-[n+]1ccc(-c2cc[n+](-c3c(Cl)cccc3Cl)cc2)cc1] |
| I-47 | 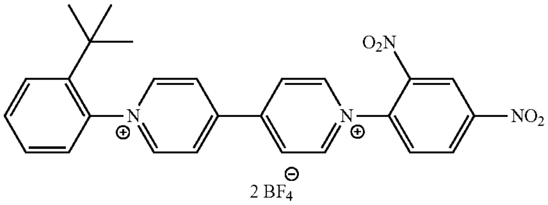 [SMILES: CC(C)(C)c1ccccc1-[n+]1ccc(-c2cc[n+](-c3ccc([N+](=O)[O-])cc3[N+](=O)[O-])cc2)cc1] |
| I-48 | 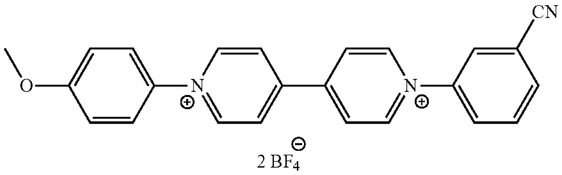 [SMILES: COc1ccc(-[n+]2ccc(-c3cc[n+](-c4cccc(C#N)c4)cc3)cc2)cc1] |
| I-49 | 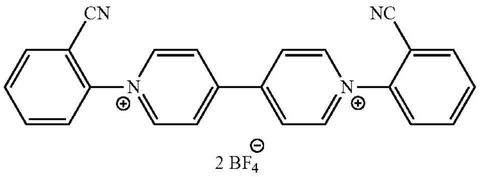 [SMILES: N#Cc1ccccc1-[n+]1ccc(-c2cc[n+](-c3ccccc3C#N)cc2)cc1] |

-continued
| Compound | Formula |
|---|---|
| I-50 | 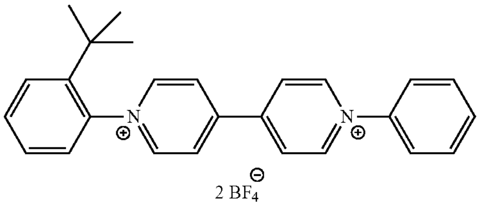 |
| II-1 | 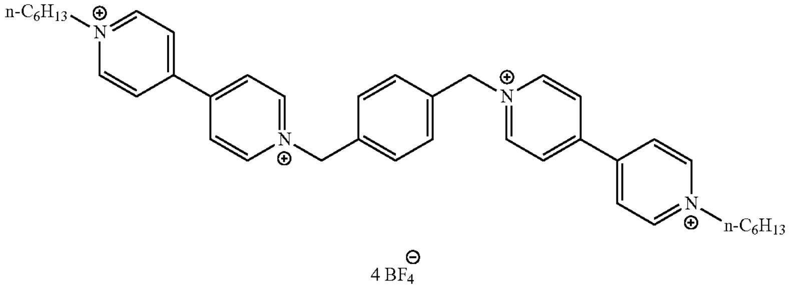 |
| II-2 | 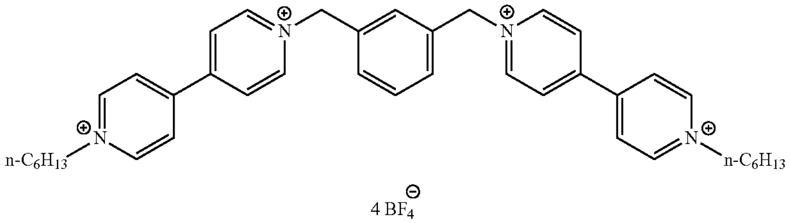 |
| II-3 | 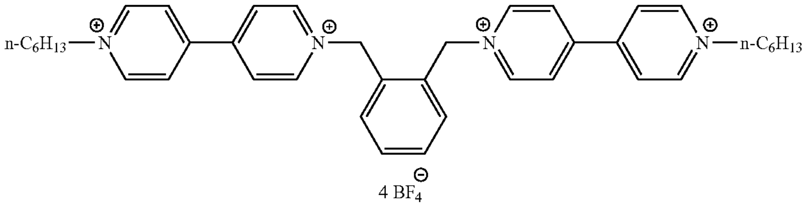 |
| II-4 | 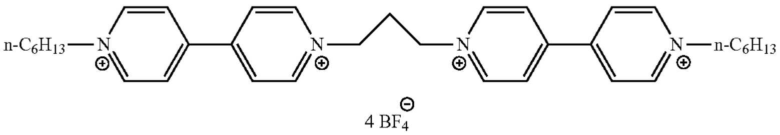 |
| II-5 | 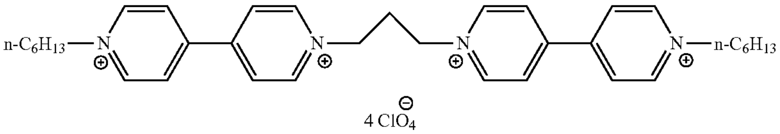 |
| II-6 | 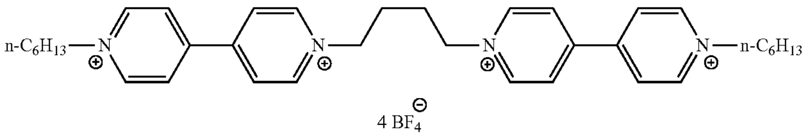 |

-continued
| Compound | Formula |
|---|---|
| II-7 | 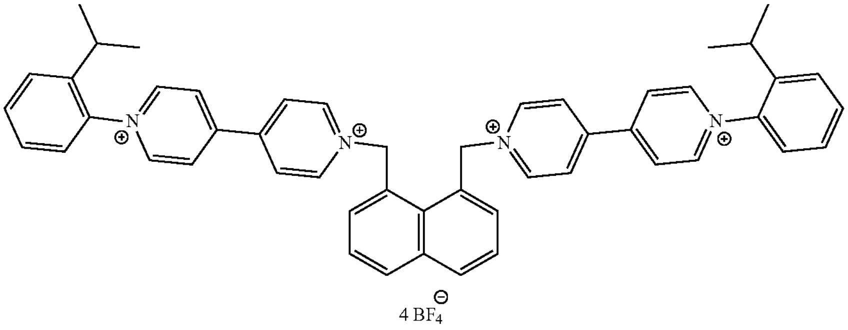 [SMILES: CC(C)c1ccccc1-[n+]1ccc(-c2cc[n+](Cc3cccc4cccc(C[n+]5ccc(-c6cc[n+](-c7ccccc7C(C)C)cc6)cc5)c34)cc2)cc1] |
| II-8 | 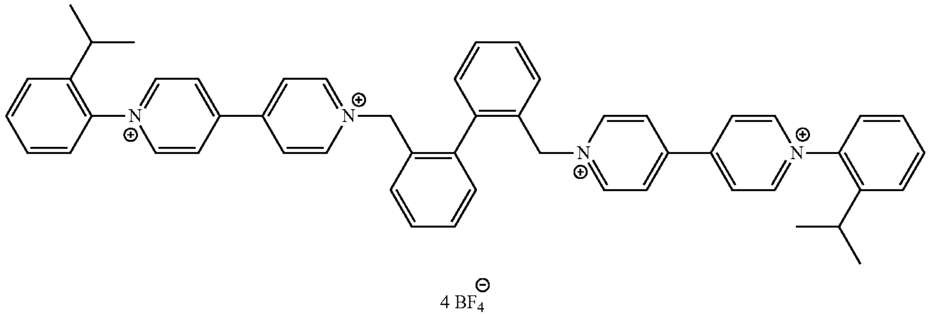 [SMILES: CC(C)c1ccccc1-[n+]1ccc(-c2cc[n+](Cc3ccccc3-c3ccccc3C[n+]3ccc(-c4cc[n+](-c5ccccc5C(C)C)cc4)cc3)cc2)cc1] |
| II-9 | 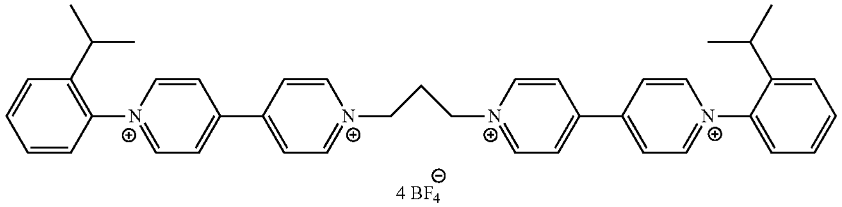 [SMILES: CC(C)c1ccccc1-[n+]1ccc(-c2cc[n+](CCC[n+]3ccc(-c4cc[n+](-c5ccccc5C(C)C)cc4)cc3)cc2)cc1] |
| II-10 | 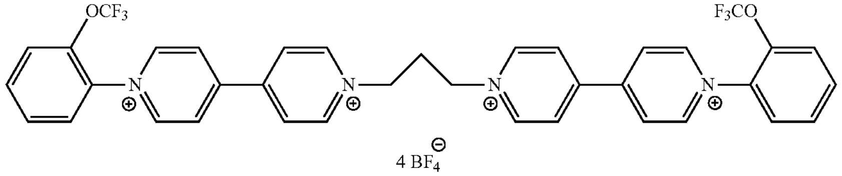 [SMILES: FC(F)(F)Oc1ccccc1-[n+]1ccc(-c2cc[n+](CCC[n+]3ccc(-c4cc[n+](-c5ccccc5OC(F)(F)F)cc4)cc3)cc2)cc1] |
| II-11 | 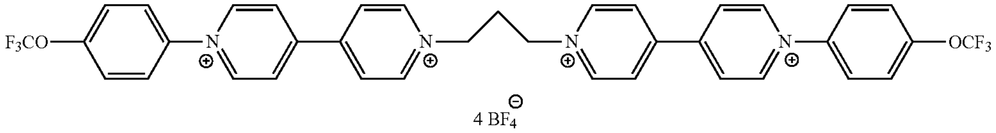 [SMILES: FC(F)(F)Oc1ccc(-[n+]2ccc(-c3cc[n+](CCC[n+]4ccc(-c5cc[n+](-c6ccc(OC(F)(F)F)cc6)cc5)cc4)cc3)cc2)cc1] |
| II-12 | 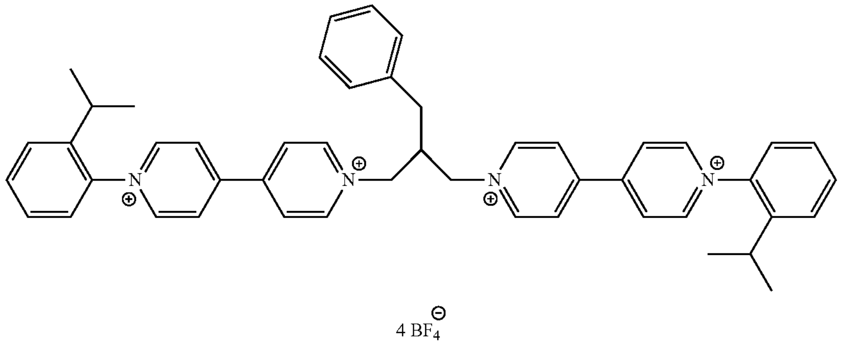 [SMILES: CC(C)c1ccccc1-[n+]1ccc(-c2cc[n+](CC(Cc3ccccc3)C[n+]3ccc(-c4cc[n+](-c5ccccc5C(C)C)cc4)cc3)cc2)cc1] |

-continued
| Compound | Formula |
| --- | --- |
| II-13 | 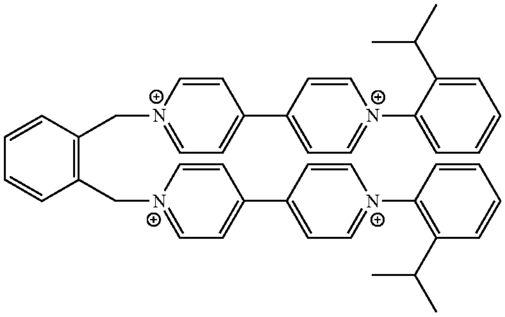 $4\ BF_4^{\ominus}$ |
| II-14 | 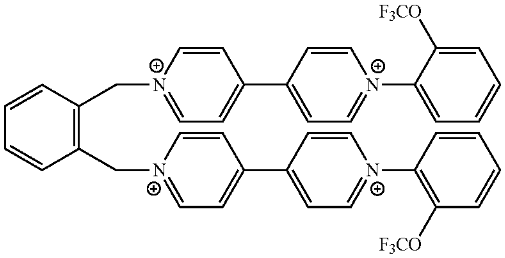 $4\ BF_4^{\ominus}$ |
| II-15 | 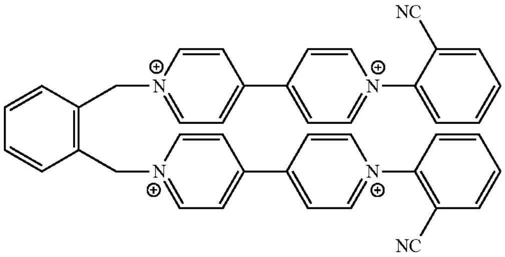 $4\ BF_4^{\ominus}$ |
| II-16 | 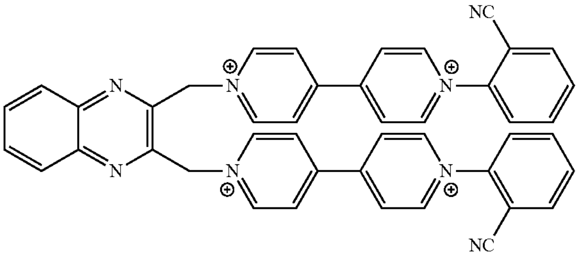 $4\ BF_4^{\ominus}$ |

-continued
| Compound | Formula |
|---|---|
| II-17 | 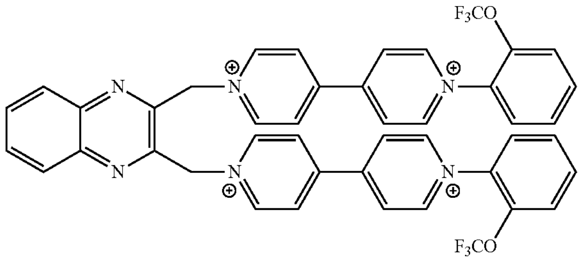 $4\ BF_4^{\ominus}$ |
| II-18 | 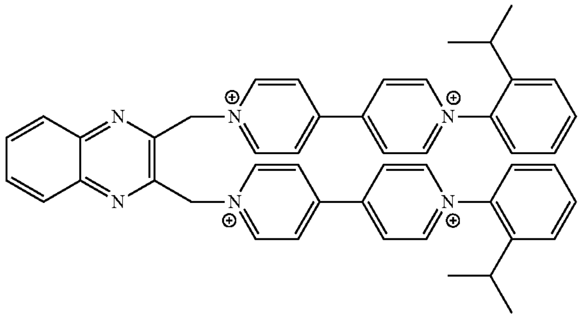 $4\ BF_4^{\ominus}$ |
| III-1 | 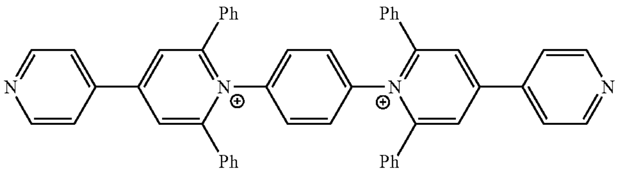 $2BF_4^{\ominus}$ |
| III-2 | 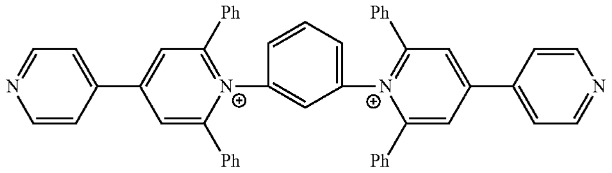 $2BF_4^{\ominus}$ |
| III-3 | 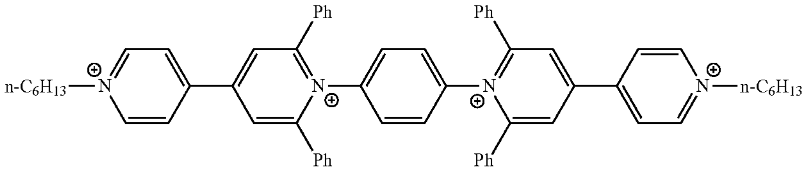 $4BF_4^{\ominus}$ |

-continued
| Compound | Formula |
| --- | --- |
| III-4 | 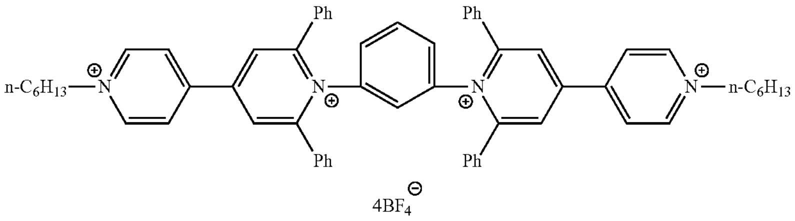 |
| III-5 | 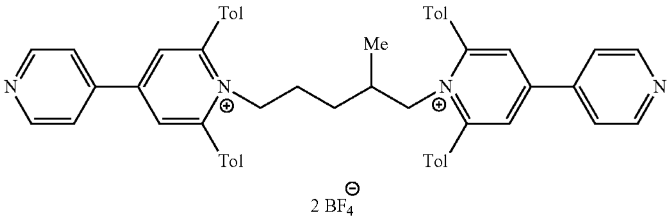 |
| III-6 | 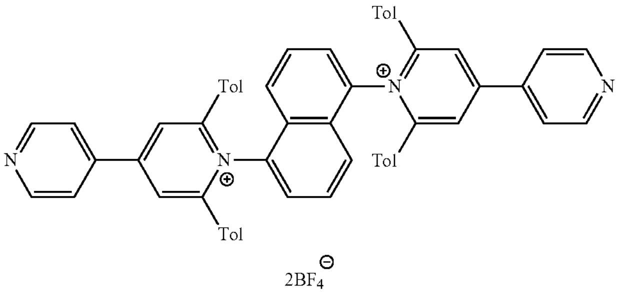 |
| III-7 | 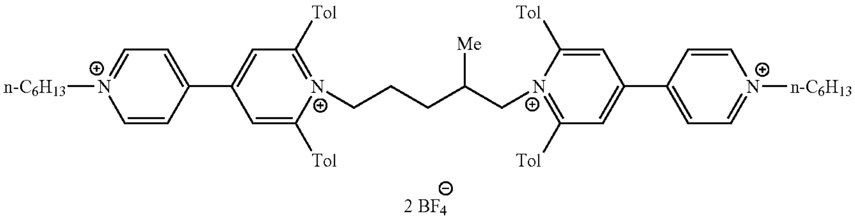 |
| III-8 | 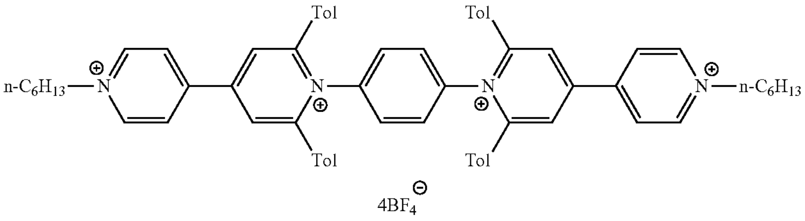 |
| III-9 | 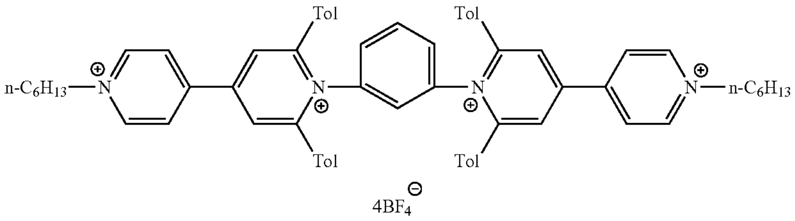 |

-continued
| Compound | Formula |
|---|---|
| III-10 | 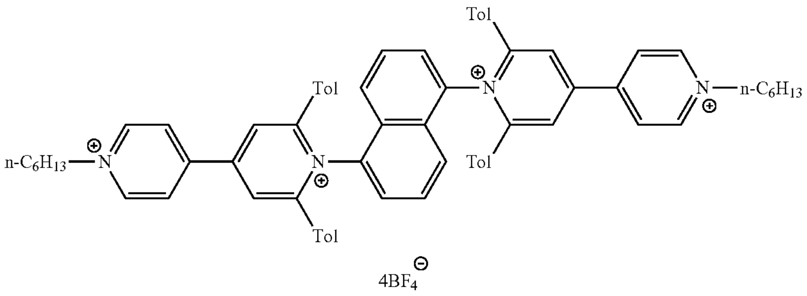 |
| III-11 | 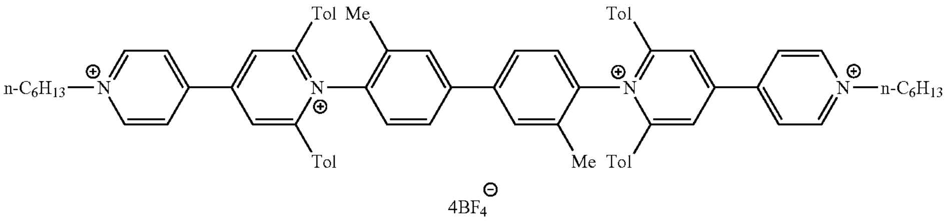 |
| III-12 | 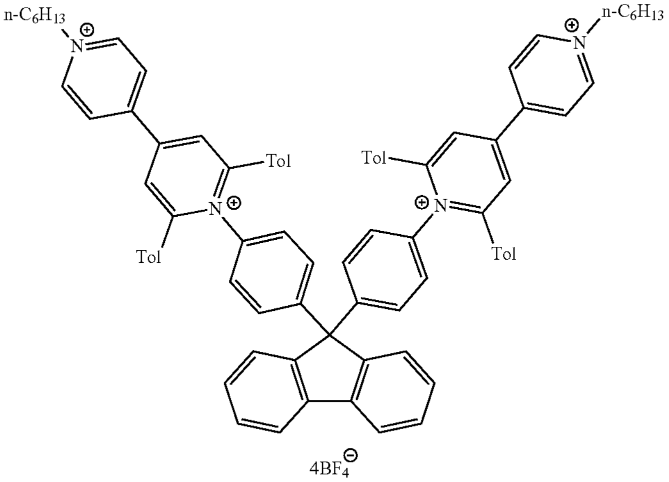 |
| III-13 | 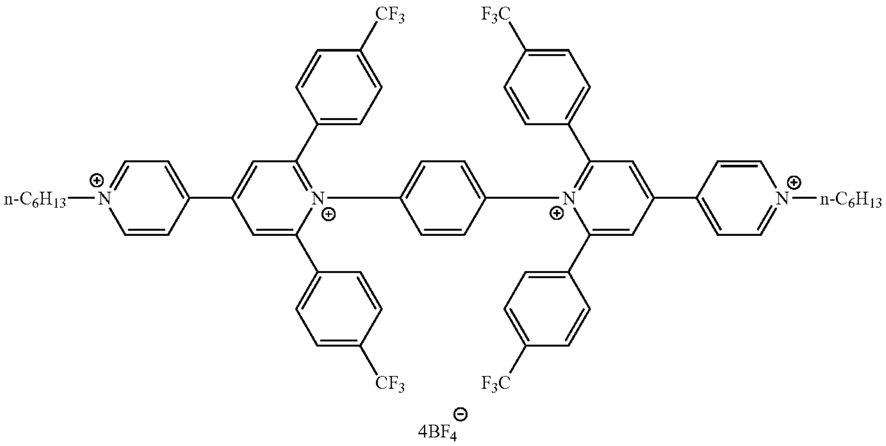 |

-continued
| Compound | Formula |
|---|---|
| III-14 | 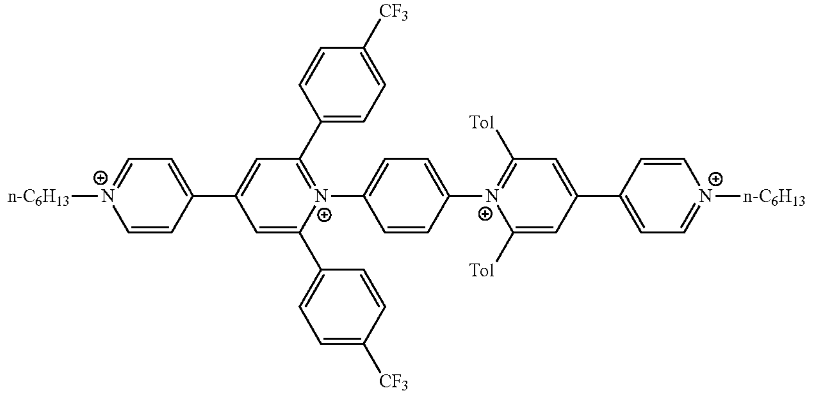 $4BF_4^{\ominus}$ |
More preferably, the at least one electrochromic oxidizing compound is selected or the at least two electrochromic compounds are selected from the series of the following compounds.
| Compound | Formula |
|---|---|
| I-1 | 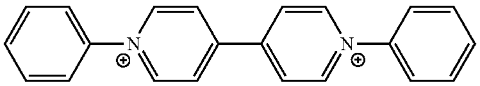 $2\ BF_4^{\ominus}$ |
| I-2 | 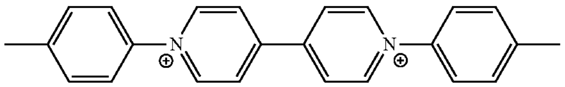 $2\ PF_6^{\ominus}$ |
| I-3 | 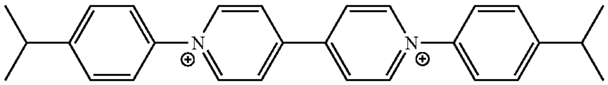 $2\ BF_4^{\ominus}$ |
| I-4 | 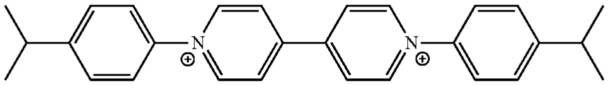 $2\ N(SO_2CF_3)_2^{\ominus}$ |
| I-5 | 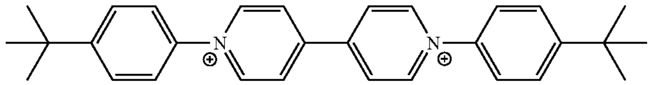 $2\ BF_4^{\ominus}$ |
| I-6 | 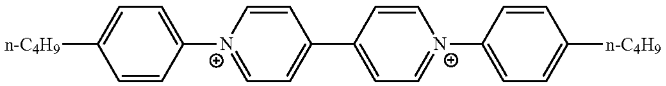 $2\ BF_4^{\ominus}$ |

-continued
| Compound | Formula |
|---|---|
| I-7 | 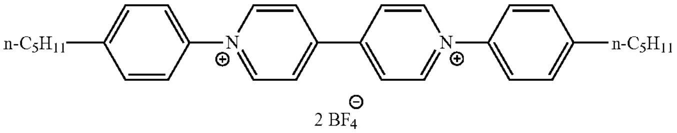 |
| I-8 | 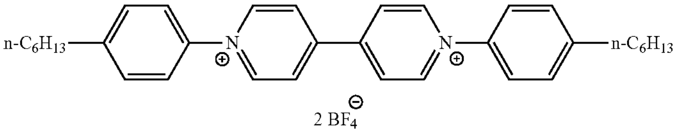 |
| I-9 | 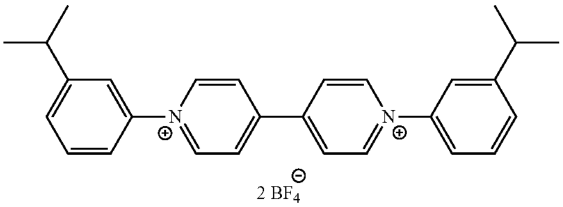 [SMILES: CC(C)c1cccc(-[n+]2ccc(-c3cc[n+](-c4cccc(C(C)C)c4)cc3)cc2)c1] |
| I-10 | 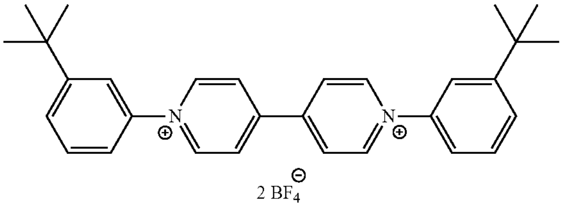 |
| I-11 | 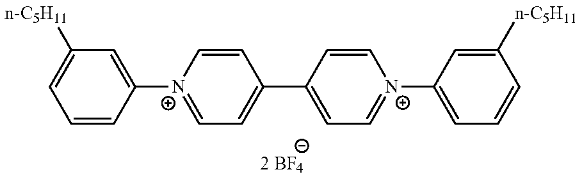 |
| I-12 | 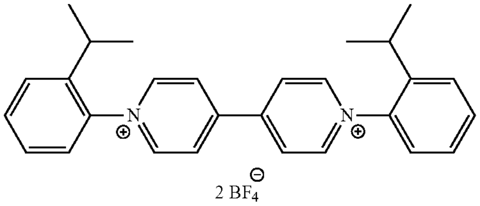 |
| I-13 | 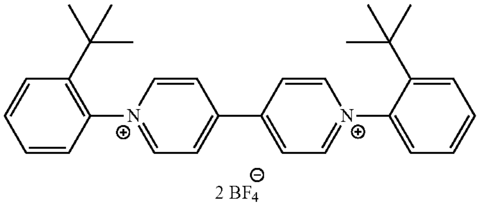 |
| I-14 | 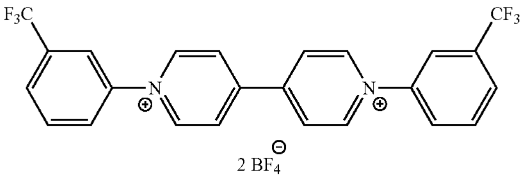 |

-continued
| Compound | Formula |
| --- | --- |
| I-16 | 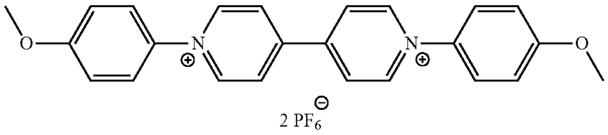 |
| I-17 | 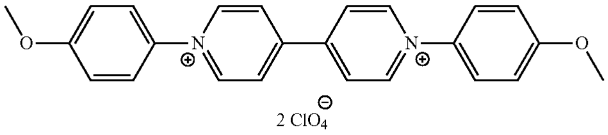 |
| I-18 | 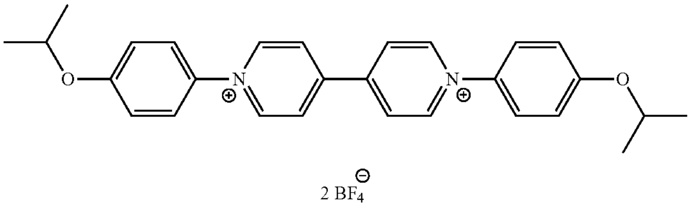 |
| I-19 | 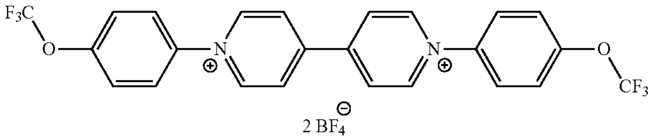 |
| I-20 | 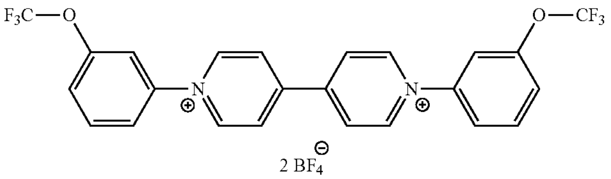 |
| I-21 | 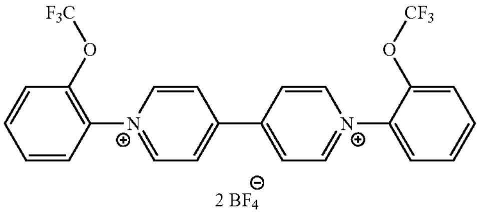 |
| I-22 | 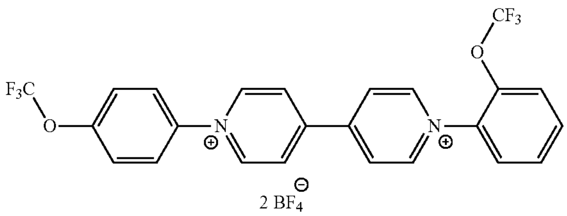 [SMILES: FC(F)(F)Oc1ccc(-[n+]2ccc(-c3cc[n+](-c4ccccc4OC(F)(F)F)cc3)cc2)cc1] |
| I-23 | 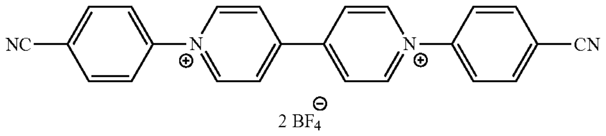 |

-continued
| Compound | Formula |
| --- | --- |
| I-24 | 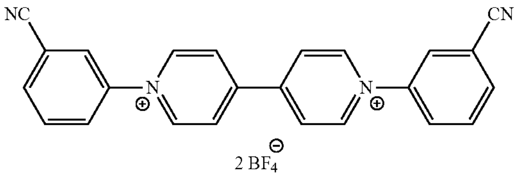 |
| I-26 | 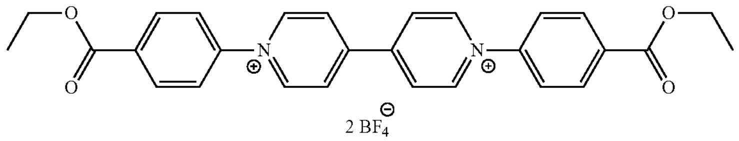 |
| I-27 | 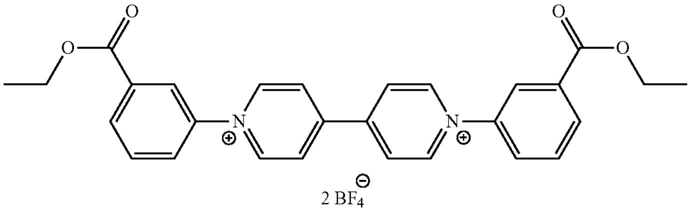 [SMILES: CCOC(=O)c1cccc(-[n+]2ccc(-c3cc[n+](-c4cccc(C(=O)OCC)c4)cc3)cc2)c1] |
| I-28 | 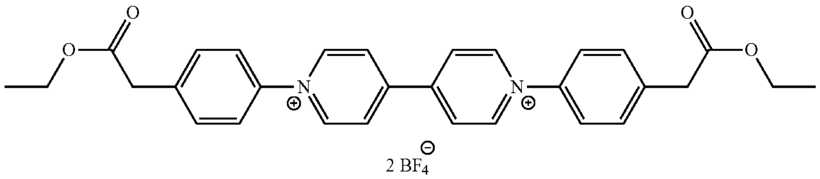 [SMILES: CCOC(=O)Cc1ccc(-[n+]2ccc(-c3cc[n+](-c4ccc(CC(=O)OCC)cc4)cc3)cc2)cc1] |
| I-29 | 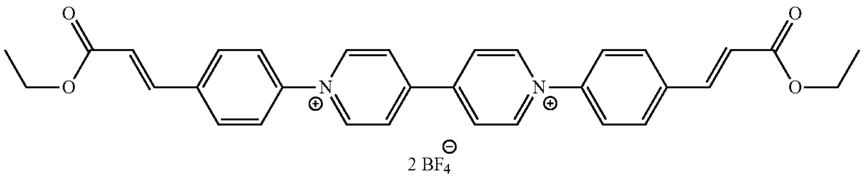 |
| I-30 | 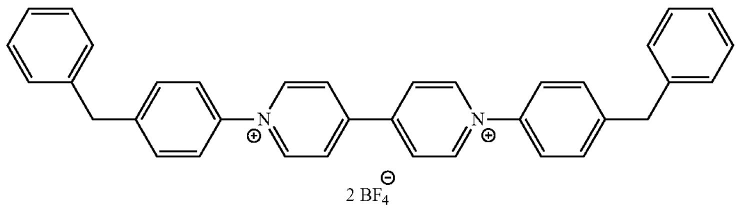 [SMILES: c1ccc(Cc2ccc(-[n+]3ccc(-c4cc[n+](-c5ccc(Cc6ccccc6)cc5)cc4)cc3)cc2)cc1] |
| I-31 | 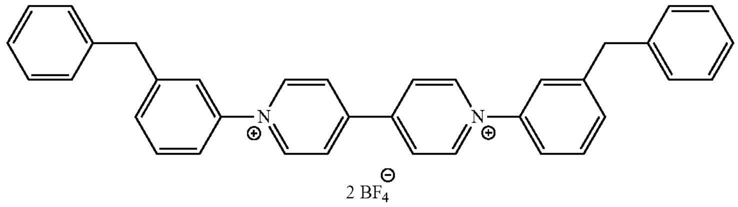 [SMILES: c1ccc(Cc2cccc(-[n+]3ccc(-c4cc[n+](-c5cccc(Cc6ccccc6)c5)cc4)cc3)c2)cc1] |

-continued
| Compound | Formula |
|---|---|
| I-32 | 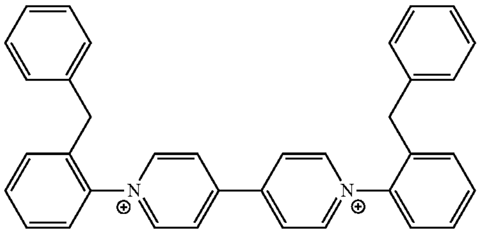 2 $BF_4^{\ominus}$ |
| I-34 | 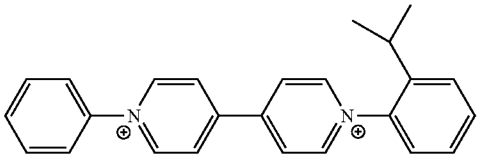 2 $BF_4^{\ominus}$ |
| I-35 | 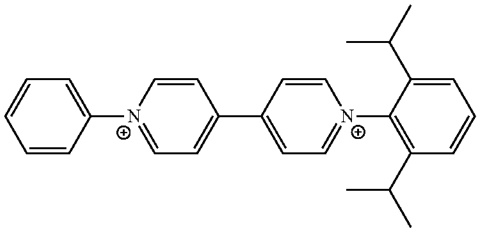 2 $BF_4^{\ominus}$ |
| I-36 | 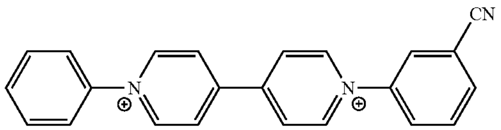 2 $BF_4^{\ominus}$ |
| I-37 | 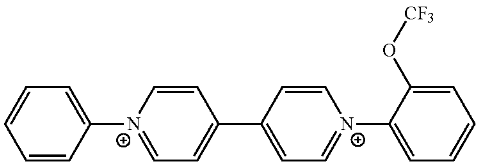 2 $BF_4^{\ominus}$ |
| I-38 | 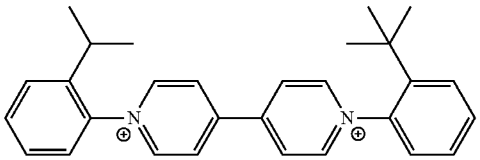 2 $BF_4^{\ominus}$ |

-continued
| Compound | Formula |
| --- | --- |
| I-39 | 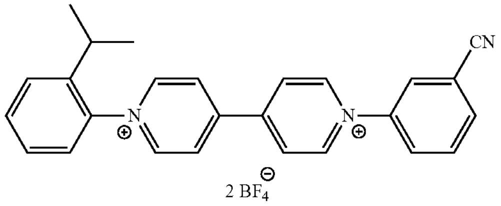 |
| I-40 | 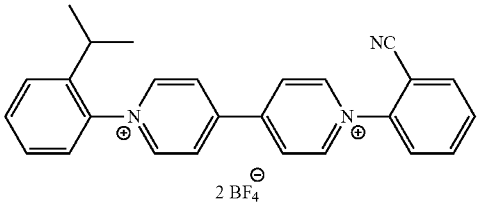 |
| I-41 | 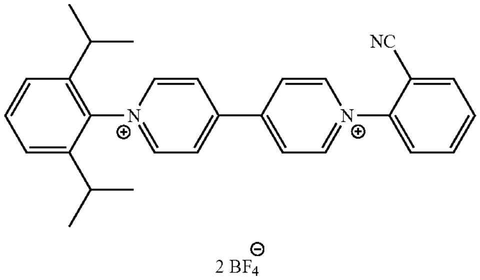 [SMILES: CC(C)c1cccc(C(C)C)c1-[n+]1ccc(-c2cc[n+](-c3ccccc3C#N)cc2)cc1] |
| I-42 | 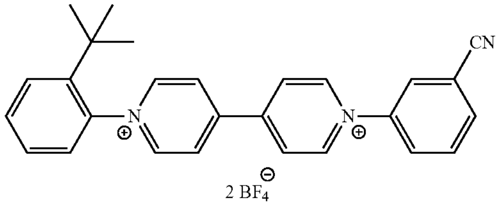 |
| I-43 | 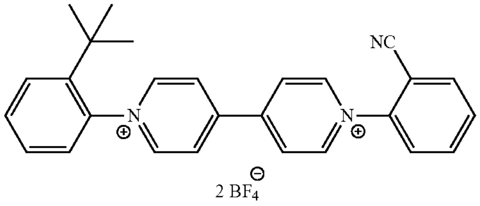 |
| I-44 | 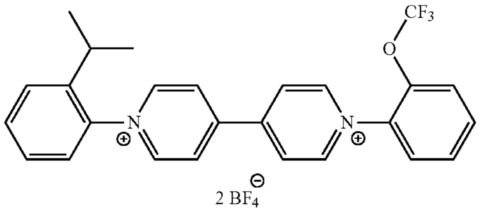 |
| I-48 | 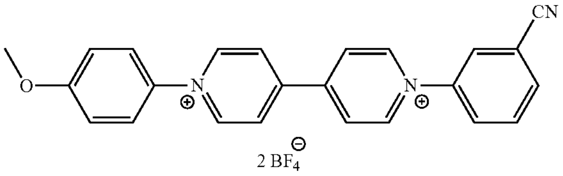 |

-continued
| Compound | Formula |
|---|---|
| I-49 | 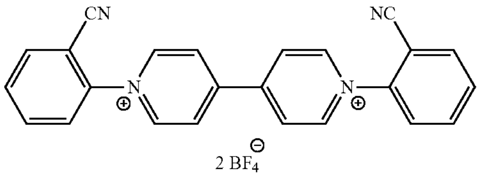 [SMILES: N#Cc1ccccc1-[n+]1ccc(-c2cc[n+](-c3ccccc3C#N)cc2)cc1] |
| I-50 | 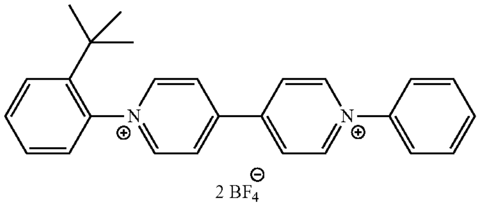 [SMILES: CC(C)(C)c1ccccc1-[n+]1ccc(-c2cc[n+](-c3ccccc3)cc2)cc1] |
| II-1 | 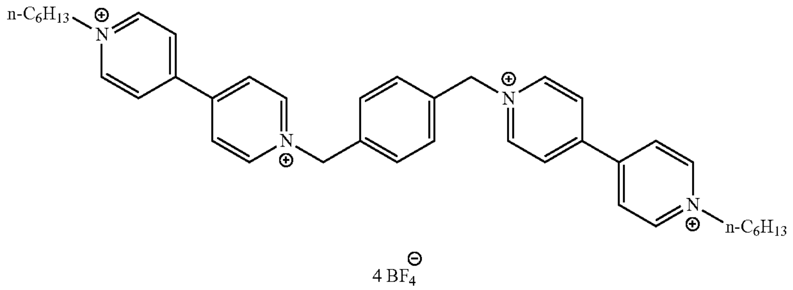 |
| II-2 | 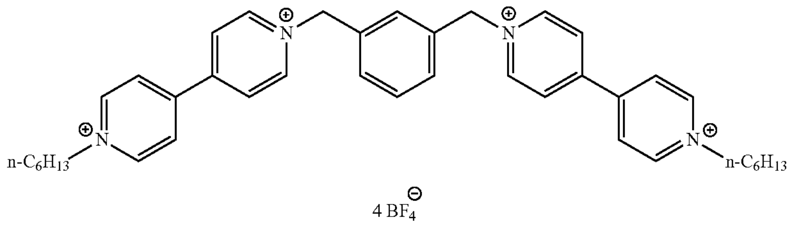 |
| II-3 | 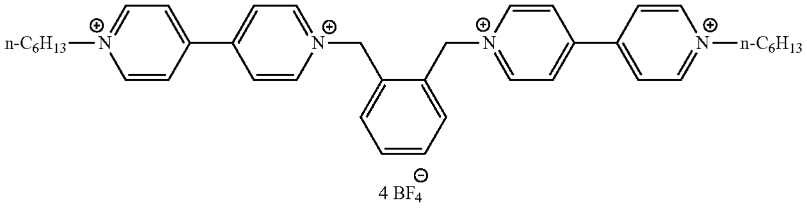 |
| II-4 | 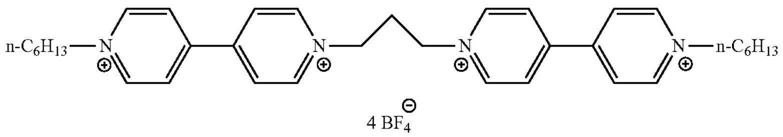 |
| II-5 | 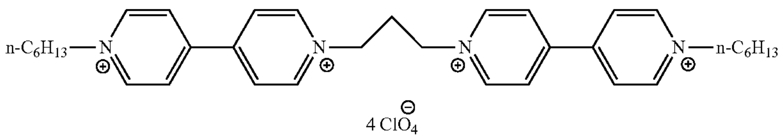 |

-continued
| Compound | Formula |
| --- | --- |
| II-6 | 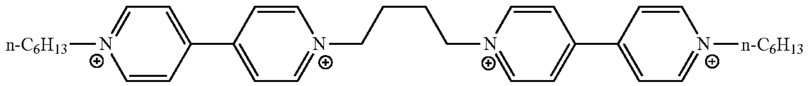 $4\ BF_4^{\ominus}$ |
| II-7 | 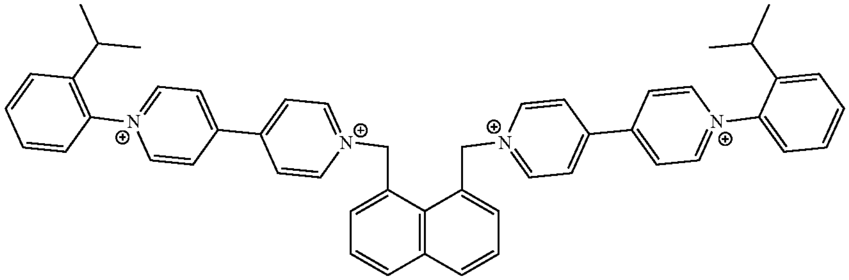 $4\ BF_4^{\ominus}$ |
| II-8 | 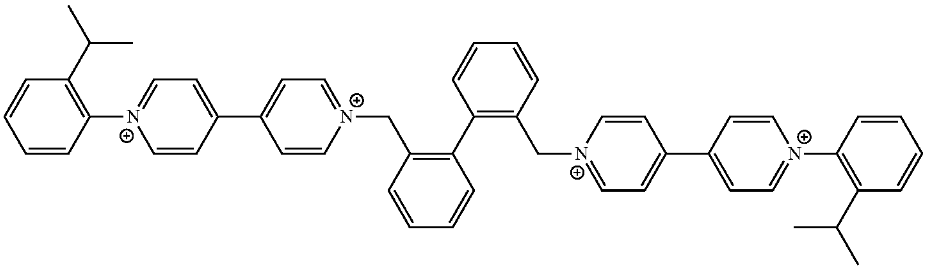 $4\ BF_4^{\ominus}$ |
| II-9 | 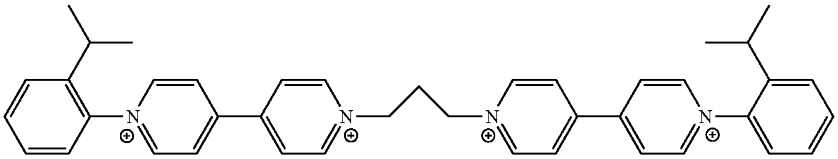 $4\ BF_4^{\ominus}$ |
| II-10 | 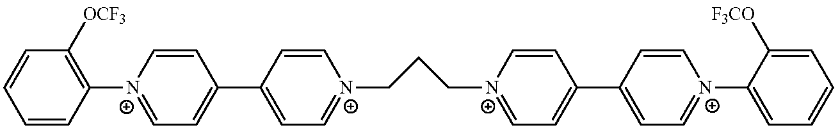 $4\ BF_4^{\ominus}$ |
| II-11 | 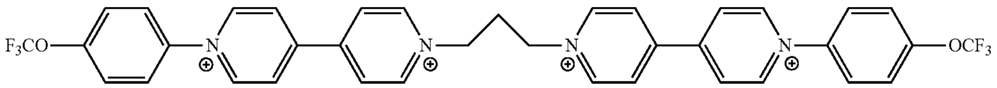 $4\ BF_4^{\ominus}$ |

-continued
| Compound | Formula |
| --- | --- |
| II-12 | 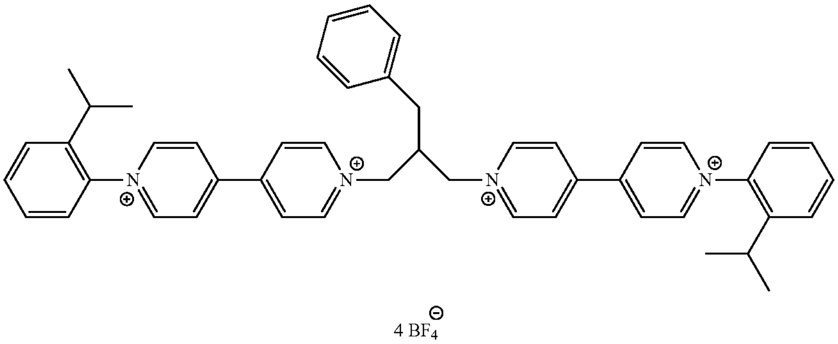 [SMILES: CC(C)c1ccccc1-[n+]1ccc(-c2cc[n+](CC(Cc3ccccc3)C[n+]3ccc(-c4cc[n+](-c5ccccc5C(C)C)cc4)cc3)cc2)cc1] |
| II-13 | 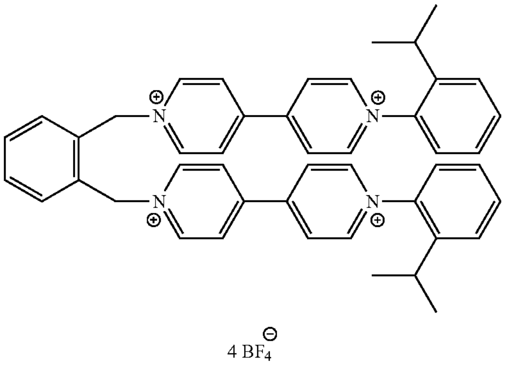 [SMILES: CC(C)c1ccccc1-[n+]1ccc(-c2cc[n+](Cc3ccccc3C[n+]3ccc(-c4cc[n+](-c5ccccc5C(C)C)cc4)cc3)cc2)cc1] |
| II-14 | 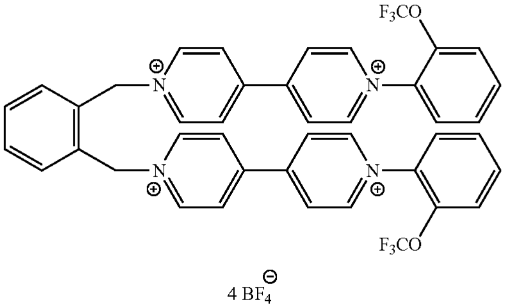 [SMILES: FC(F)(F)Oc1ccccc1-[n+]1ccc(-c2cc[n+](Cc3ccccc3C[n+]3ccc(-c4cc[n+](-c5ccccc5OC(F)(F)F)cc4)cc3)cc2)cc1] |
| II-15 | 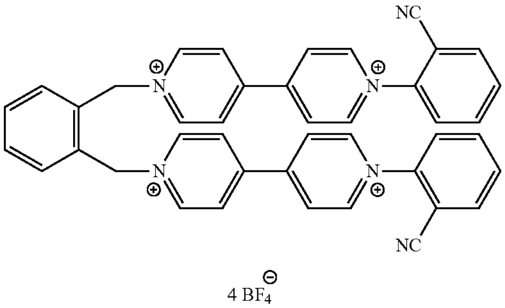 [SMILES: N#Cc1ccccc1-[n+]1ccc(-c2cc[n+](Cc3ccccc3C[n+]3ccc(-c4cc[n+](-c5ccccc5C#N)cc4)cc3)cc2)cc1] |

In one particularly preferred embodiment, the redox chemical mixture is constituted of:

one reducing compound and at least one electrochromic oxidizing compound, preferably at least two electrochromic oxidizing compounds, said at least one electrochromic oxidizing compound, being either a compound of formula Ia or a compound of formula IIa and said at least two electrochromic oxidizing compounds being chosen from the group consisting of compounds of formula Ia and compounds of formula IIa Compound of formula Ia

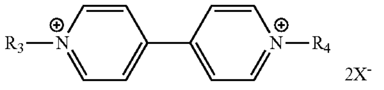

With $R^3$ and $R^4$ independently selected from:

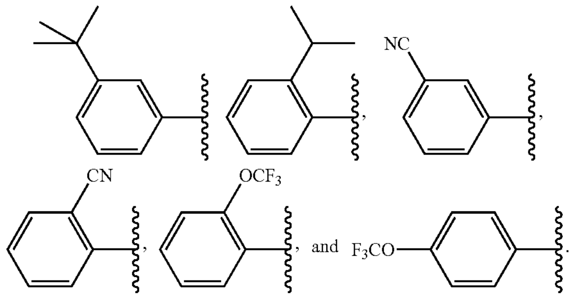

And $X^-$ is a counterion selected from halide, tetrafluoroborate, tetraphenylborate, hexafluorophosphate, nitrate, methanesulfonate, trifluoromethane sulfonate, toluene sulfonate, hexachloroantimonate, bis(trifluoromethanesulfonyl)imide, perchlorate, acetate and sulfate.

Compound of formula (II a)

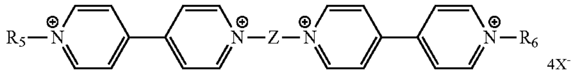

wherein Z is $-CH_2-$, $-(CH_2)_2-$, $-(CH_2)_3-$, $-(CH_2)_4-$, $-(CH_2)_5-$, $-CH_2-CH(CH_3)-CH_2-$, $-CH_2-CH(CH_2Phenyl)-CH_2-$, $-(CH_2)_2-CH(CH_3)-CH_2-$, $-(CH_2)_3-CH(CH_3)-CH_2-$, $-(CH_2)_2-$ and $CH(CH_3)-(CH_2)_2-$, and $R^5$ and $R^6$ are selected from alkyl and optionally substituted phenyl groups, preferably substituted phenyl groups independently selected from:

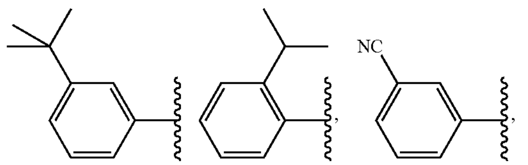

-continued

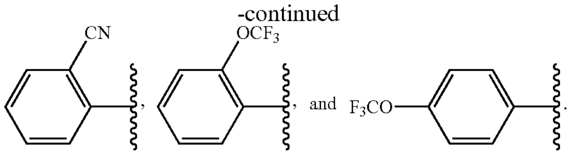

and

According to a preferred embodiment, the redox chemical mixture is chosen from the mixture constituted of 10-methylphenothiazine and of at least two electrochromic oxidizing compounds chosen from the group consisting of compounds of formula I-10 and II-10 and I-38 and II-10.

(I-10)

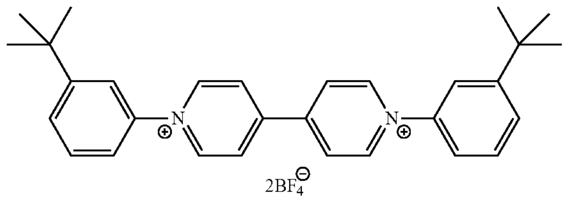

(I-38)

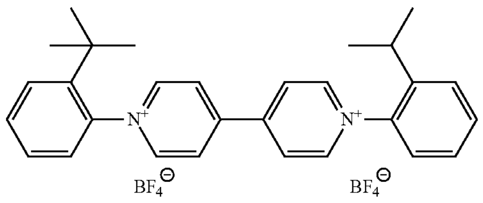

(II-10)

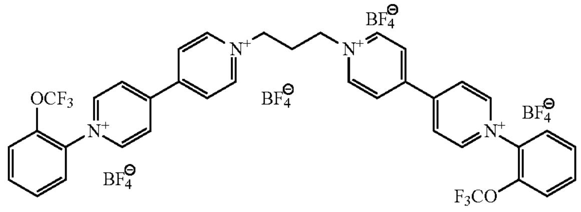

The composition of the invention may further comprise an inert current-carrying electrolyte. The inert current-carrying electrolyte should be compatible with the other components of the composition. In particular, the inert current-carrying electrolyte should not react with the electrochromic compounds.

Examples of inert current-carrying electrolyte include, but are not limited to, alkali metal salts, lithium, sodium or tetraalkylammonium salts, aluminium chloride and aluminium boride, persulfates and bis(fluorosulfonyl)imide. The inert current-carrying electrolyte is preferably selected from sodium, lithium and tetraalkylammonium ions in combination with inert anion selected preferably from chloride, tetrafluoroborate, hexafluoroborate and perchlorate.

Other examples of inert anions are tetraphenylborate, cyano-triphenylborate, tetramethoxyborate, tetrapropoxyborate, tetraphenoxyborate, perchlorate, chloride, nitrate, sulphate, phosphate, methanesulphonate, ethanesulphonate, tetradecanesulphonate, pentadecanesulphonate, trifluoromethanesul phonate, perfluorobutanesulphonate, perfluorooctanesulphonate, benzenesulphonate, chlorobenzenesulphonate, toluenesulphonate, butylbenzenesulphonate, tert-butylbenzenesulphonate, dodecylbenzenesulphonate, trifluoromethylbenzenesulphonate, hexafluorophosphate, hexafluoroarsenate or hexafluorosilicate. Most preferred inert current-carrying electrolyte is tetra-n-butylammonium tetrafluoroborate.

When present in the electrochromic composition, the concentration of the inert current-carrying electrolyte is typically from 0.005 to 2 M, preferably from 0.01 to 1 M, more preferably from 0.05 to 0.5 M.

Suitable further additives for the electrochromic medium for the occasionally desired protection against UV light (<350 nm) are for example UV absorbers. Examples are 2,4-dihydroxybenzophenone (UVI NUL® 3000, BASF), 2-hydroxy-4-n-octyloxybenzophenone (SANDUVOR® 3035, Clariant), 2-(2H-benzotriazol-2-yl)-6-dodecyl-4-methylphenol (Tinuvin® 571, Ciba), 2,2'-dihydroxy-4-methoxy-benzophenone (Cyasorb 24™, American Cyanamid Company), ethyl 2-cyano-3,3-diphenylacrylate (UVINUL® 3035, BASF 2-ethylhexyl 2-cyano-3,3-diphenyl-acrylate (UVINUL® 3039, BASF), 2-ethylhexyl p-methoxycinnamate (UVINUL® 3088, BASF), 2-hydroxy-4-methoxy-benzophenone (CHIMASSORB® 90, Ciba), dimethyl 4-methoxybenzylidenemalonate (SANDUVOR® PR-25, Clariant).

Further additives for the electrochromic solution may also be selected from permanent dyes or heat stabilizers.

Preferably, all the components of the composition, other than electrochromic compounds, are essentially transparent to visible light so that when the electrochromic compounds are in their bleached state, the composition appears to be essentially transparent to visible light or takes the color of the permanent dyes if present.

According to a second aspect, the present invention relates to an electrochromic device comprising the electrochromic solution as defined in the first aspect.

The electrochromic device comprises a mechanism for holding the solution in a mechanically stable environment.

The electrochromic device comprises at least one transparent electrochromic cell comprising a pair of opposed substrates facing each other and forming a gap, and the gap is filled with the electrochromic solution as defined here above.

More generally all the characteristics described above in connection with the electrochromic solution also apply to the electrochromic device, said electrochromic device being another object of the present invention. Conversely, all the characteristics described below in connection with the device also apply to the electrochromic solution.

Preferably, the electrochromic solution has a neutral colour in the coloured state.

The electrochromic device is selected from optical article such as optical lenses or optical filters or attenuators, windows, visors, goggles, mirrors and displays, preferably optical lenses such as ophthalmic lenses, more preferably ophthalmic lenses and goggles.

Non-limiting examples of ophthalmic lens include corrective and non-corrective lenses, including single vision or multi-vision lenses (i.e afocal, unifocal, bifocal, trifocal and progressive lenses), which may be either segmented or non-segmented, as well as other elements used to correct, protect, or enhance vision, including without limitation contact lenses, intra-ocular lenses, magnifying lenses (such as lenses for contrast enhancement in augmented reality devices or virtual reality devices) and protective lenses (such as sun glasses or sun lenses) or visors. Non-limiting examples of display elements and devices include screens and monitors. Non-limiting examples of windows include automotive, marine and aircraft windows, filters, attenuators, shutters, and optical switches.

The device may contain functional layers such as polarizing layers, photochromic layer, anti-reflecting coatings, visible light and UV absorbing coatings, impact-resistant coatings, abrasion-resistant-coating, anti-smudge-coating, anti-fog coating, anti-dust coating, all of which are familiar to the skilled person. The electrochromic device of the invention may comprise a mechanism for holding the composition in a mechanically stable environment.

For example, the electrochromic device of the invention comprises an electrochromic cell including two substrates facing each other. The substrates are preferably optical substrate such as any mineral or organic glass commonly known and used in the optical field. It may be sodocalcic or borosilicate mineral glass for instance. It may be a thermoplastic resin such as a thermoplastic polycarbonate (PC), PET, PEN, PMMA, COC, COP, PVDC, cellulose triacetate or a thermoset or photo-cured resin such as polyurethane, polyurethane/polyurea (such as TRIVEX®) or polythiourethane. In case where the electrochromic device is used as an ophthalmic lens, the substrates used for manufacturing the cell may have a spherical shape or aspheric shape. The internal sides of the substrates may be coated with transparent conductive electrodes ("TCO"). The conductive electrodes may be formed of a transparent conductive material such as, for example indium tin oxide ("ITO"), fluorine-doped tin oxide ("FTO"), aluminium-doped zinc oxide ("AZO"), gallium-doped zinc oxide ("GZO"), indium-doped zinc oxide ("IZO"), aluminium gallium zinc oxide ("AGZO"), indium gallium zinc oxide ("IGZO"). The sheet resistance of these TCO must be below 100 ohm/square, preferably below 40 ohm/square, and even preferably below 10 ohm/square. The substrates may be held at fixed distance from each other, for example with a spacer of 10 μm to 400 μm, preferably of 20 to 250 μm, and more preferably of 150 μm, in order to form a gap wherein the electrochromic composition is introduced.

The electrochromic solution can be, for instance, injected into the electrochromic devices by using either a vacuum backfilling process or a one-drop filling process. When vacuum backfilling process is used to inject the solution into the cell, it is preferable to make cells with only one hole. Furthermore, in such case, when vacuum backfilling process is used, the additive used shows preferably a high boiling point, has preferably a boiling point higher than 100° C. Additives with a boiling point lower than 100° C. are difficult to manage.

Another device of the present invention comprises an optical component provided with at least one transparent cell arrangement juxtaposed in a parallel direction to the surface thereof, as disclosed in WO 2006/013250, each cell being tightly closed and containing said fluid, mesomorphous or gel host medium and said at least one compound of the present invention. Other devices according to the invention can be a device as described in FR 2937154 or FR 2950710 comprising at least one compound of the invention.

According to a third aspect, the invention relates to the use of a mixture consisting of a thickening polymer agent having a molecular weight of at least 50,000 g/mol, preferably of at least 200,000 g/mol and additive having a molecular weight between 300 and 50,000 g/mol in an electrochromic solution according as defined here above for reducing leakage current and color segregation.

EXAMPLE

This invention will be further illustrated by the following non-limiting examples which are given for illustrative purposes only and should not restrict the scope of the appended claims.

Four electrochromic samples have been made with four different electrochromic solutions to demonstrate the effect of the combination of the two types of compounds, the thickening polymer agent and the additives on both the leakage current/bleaching rate and viscosity.

Solution 1 was prepared by dissolving, in propylene carbonate (98.96 wt %):

- the electrochromic reducing compound 10-methylphenothiazine (0.35 wt. %),
- the electrochromic oxidizing compound ethyl viologen diperchlorate (0.69 wt. %).

Solution 2 was prepared by dissolving, in propylene carbonate (90.96 wt %):

- the electrochromic reducing compound 10-methylphenothiazine (0.35 wt. %),
- the electrochromic oxidizing compound ethyl viologen diperchlorate (0.69 wt. %),
- the thickening polymer agent PVAC (8 wt. %).

Solution 3 was prepared by dissolving, in propylene carbonate (86.96 wt. %):

- the electrochromic reducing compound 10-methylphenothiazine (0.35 wt. %),
- the electrochromic oxidizing compound ethyl viologen diperchlorate (0.69 wt. %)
- the thickening polymer agent PVAC (12 wt. %).

Solution 4 was prepared by dissolving, in propylene carbonate (70.96 wt. %):

- the electrochromic reducing compound 10-methylphenothiazine (0.35 wt. %),
- the electrochromic oxidizing compound ethyl viologen diperchlorate (0.69 wt. %)
- the thickening polymer agent PVAC (8 wt. %),
- the additive polyethylene glycol dibenzoate (PEGDB) in liquid form (20 wt. %).

Propylene carbonate, ethyl violologen diperchlorate, 10-methylphenothiazine are sold by Sigma Aldrich.

The PVAC used is sold under the name Vinnapas UW25FS by Wacker. It has a molecular weight of 540,000 g/mol measured by SEC, PS-Standard.

The PEGDB used is Poly(ethylene glycol) dibenzoate sold by Sigma Aldrich having a molecular weight of 410 g/mol and a boiling point of 217° C.

A tank was filled at room temperature and atmospheric pressure with the electrochromic solutions 1 to 4 as described above. A cell was then placed vertically in the tank under atmospheric pressure in such way that the opening was located above the solution level. This cell included two mineral glass substrates facing each other, the internal sides of which were coated with transparent conductive electrodes made of indium tin oxide (ITO). The substrates were held at fixed distance from one another by using spacers of 150 μm, in order to form a gap. The edge of the cell was sealed with a UV curable adhesive in such a way that an opening of 5 mm was left.

The tank with the cell was placed in a vacuum-desiccator, which was evacuated to 0.5 mBar. During the aeration of the tank under the introduction of an inert gas, the electrochromic formulation filled the entire volume of the gap through the opening. The opening was then sealed with a UV curable adhesive in order to make the cell hermetic. The electrical connection was made by two silver plated copper wires, sealed on each ITO glass substrate with a silver charged epoxy adhesive.

Current consumption is measured with a common amperometer, when the current stabilizes typically after one minute.

The viscosity is measured by using a Brookfield viscosimeter.

The sample is put in a spectrophotometer and the bleaching rate is the time measured at from the higher value of visual transmission (Tv=85%) to reach 10% of transmission (Tv) under activation. Applied voltage is 1.2V to reach 10% of transmission.

The results regarding current consumption, bleaching rate and viscosity are provided in Table 1.

TABLE 1

| | Current consumption (mA) | Bleaching rate (s) | Viscosity (cP) at 25° C. |
|---|---|---|---|
| Solution 1 | 16.5 mA | 8 | 3 |
| Solution 2 | 12.3 mA | 13 | 420 |
| Solution 3 | 9.1 mA | 15 | 2500 |
| Solution 4 (invention) | 6.25 mA | 21 | 1000 |

Solution 1 containing only solvent and electrochromic compounds (methylphenothiazine and ethyl viologen diperchlorate) show a high current consumption. The segregating effect is visible after 1 hour.

PVAC at 8 wt % and 12 wt % is added to solutions 2 and 3. It is thus observed that the leakage current is reduced and the viscosity increases, especially when PVAC is added at 12 wt %. In the latter case a viscosity of 2500 cP is considered to be a very high value. In both of these cases, the segregation effect is removed and current decreases.

In solution 4, by adding 8 wt % of PVAC and 20 wt % of liquid PEGDB, segregation is removed; the current consumption is strongly reduced with a moderate increase of the viscosity compared to sample with solution 3. The addition of PEGDB increase the viscosity from 420 to 1000 cP measured at 25° C.;

Thus, the inventive solution 4 strikes a good balance between leakage current/bleaching rate and viscosity due to the synergetic effect obtained from the use of the thickening polymer agent and additive.

The invention claimed is:

1. An electrochromic solution comprising:

a solvent;

from 1 to 15 wt. % relative to a total weight of the electrochromic solution of a thickening polymer agent having a molecular weight of at least 200,000 g/mol;

from 15 to 30 wt. % relative to the total weight of the electrochromic solution of at least one additive having a molecular weight higher than 500 g/mol and lower than 50,000 g/mol; and a redox chemical mixture in solution in the solvent, the mixture being constituted of at least one electrochromic reducing compound and at least one electrochromic oxidizing compound, and which colors in the presence of an applied voltage and which bleaches to a colorless condition in the absence of an applied voltage, wherein a solid content of the thickening polymer agent, at least one additive and electrochromic compounds in the electrochromic solution is less than 45 wt. %, and a viscosity of the electrochromic solution at 25°C is 3000 cP or less.

2. The electrochromic solution according to claim 1, wherein the solvent is selected from the group consisting of ethylene carbonate, propylene carbonate, γ-butyrolactone, γ-valerolactone, acetronitrile, propionitrile, benzonitrile, glutaronitrile, methylglutaronitrile, dimethylformamide, N-methylpyrrolidone, sulfolane, 3-methyl sulfolane, methyl propionate, ethylene glycol, ethylene carbonate, propylene glycol diacetate, propylene glycol methyl ether acetate, ionic liquids, and mixtures thereof.

3. The electrochromic solution according to claim 1, wherein the thickening polymer agent is a vinyl acetate polymer.

4. The electrochromic solution according to claim 1, wherein the additive is an ester derivative of benzoic acid or an ester derivative of phthalic acid, or a mixture thereof.

5. The electrochromic solution according to claim 1, wherein the additive is an ester derivative of benzoic acid of formula (I) or (II), (I)

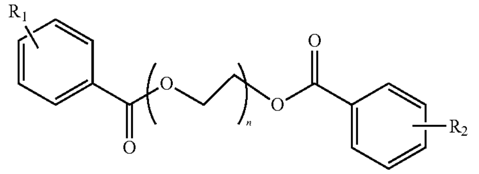

(II)

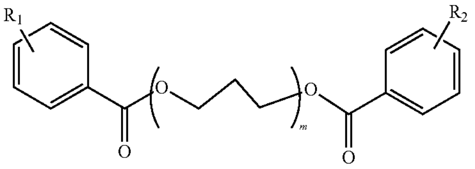

wherein $R_1$ and $R_2$ are same or different and are selected from H, optionally substituted alkyl, optionally substituted aryl, or optionally substituted cycloalkyl, wherein n is an integer ranging from 1 to 10, and wherein m is an integer ranging from 1 to 10.

6. The electrochromic solution according to claim 1, wherein the additive is selected from the group consisting of bis (2-ethylhexyl phthalate) (DEHP), diisononyl phthalate (DINP), dioctyl phthalate (DNOP), diisodecyl phthalate (DIDP), dipropylheptyl phthalate (DPHP), di-2-ethylhexyl terephthalate (DOTP or DEHT) and a mixture thereof.

7. The electrochromic solution according to claim 1, wherein the additive is selected from the group consisting of polyethylene glycol diacrylate, polyethylene glycol methacrylate, polyethylene glycol diepoxy, polypropylene glycol diacrylate, polypropylene glycol diacrylate, polypropylene glycol diepoxy and a mixture thereof.

8. The electrochromic solution according to claim 1, wherein the additive is selected from the group consisting of poly(methyl methacrylate) (PMMA), polyvinyl acetate (PVA), polyvinyl butyral (PVB), cellulose acetate butyrate (CAB) and mixture thereof.

9. The electrochromic solution according to claim 1, wherein the electrochromic solution comprises at least two additives independently selected from the group consisting of ester derivatives of benzoic acid, ester derivatives of phthalic acid, glycol derivatives and low molecular weight polymers.

10. The electrochromic solution according to claim 1, wherein the thickening polymer agent is a vinyl acetate polymer present from 5 to 15 wt % by weight relative to the total weight of the electrochromic solution and the additive is polypropylene glycol dibenzoate or polyethylene glycol dibenzoate present from 15 to 25 wt % by weight relative to the total weight of the electrochromic solution.

11. The electrochromic solution according to claim 1, wherein the at least one electrochromic reducing compound is selected from the group consisting of ferrocene, ethyl ferrocene, t-butyl ferrocene, phenoxazine, N-benzylphenoxazine, phenazine, N,N,N',N'-tetramethyl-p-phenylenediamine, phenothiazine, thioanthrene, and tetrathiafulvalene.

12. The electrochromic solution according to claim 11, wherein the phenazine is 5,10-dihydrophenazine.

13. The electrochromic solution according to claim 11, wherein the phenothiazine is 10-methylphenothiazine or isopropylphenothiazine.

14. The electrochromic solution according to claim 1, wherein the at least one electrochromic oxidizing compound is selected from the group consisting of alkylviologens, arylviologens, arylalkylviologens, alkylarylviologens, anthraquinone and derivatives thereof.

15. An electrochromic device comprising the solution of claim 1.

16. The electrochromic device according to claim 15, wherein the electrochromic device is selected from the group consisting of optical lenses, optical filters, attenuators, windows, visors, goggles, mirrors and displays.

17. The electrochromic solution according to claim 1, wherein the additive is selected from the group consisting of dipropylene glycol dibenzoate (DPGDB), tripropylene glycol dibenzoate (TPGDB), diethylene glycol dibenzoate (DEGDB), triethylene glycol dibenzoate (TEGDB), and a mixture thereof.

18. The electrochromic solution of claim 1 further comprising:

an inert current-carrying electrolyte.

19. An electrochromic solution comprising:

a solvent;

from 1 to 15 wt. % relative to a total weight of the electrochromic solution of a thickening polymer agent having a molecular weight of at least 200,000 g/mol;

from 15 to 30 wt. % relative to the total weight of the electrochromic solution of at least one additive having a molecular weight between 300 and 50,000 g/mol;

a redox chemical mixture in solution in the solvent, the mixture being constituted of at least one electrochromic reducing compound and at least one electrochromic oxidizing compound, and which colors in the presence of an applied voltage and which bleaches to a colorless condition in the absence of an applied voltage, wherein a content of the additive is from 5 to 60 wt %, relative to a total weight of the electrochromic solution and wherein a content of the thickening polymer agent is from 1 to 30 wt %, relative to the total weight of the electrochromic solution, wherein a solid content of the thickening polymer agent, at least one additive and electrochromic compounds in the electrochromic solution is less than 45 wt. %, the additive is an ester derivative of benzoic acid of formula (I) or (II), the additive is (1) an ester derivative of benzoic acid or an ester derivative of phthalic acid or a mixture thereof;

(2) an ester derivative of benzoic acid of formula (I) or (II)

(I)

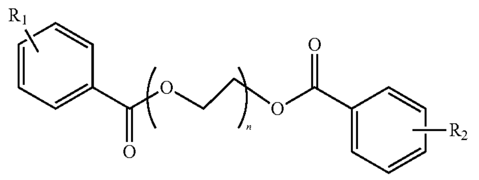

(II)

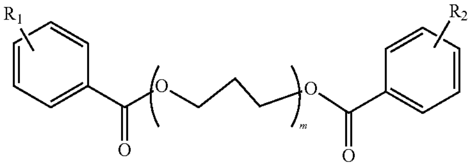

wherein $R_1$ and $R_2$ are the same or different and are selected from H, optionally substituted alkyl, optionally substituted aryl, or optionally substituted cycloalkyl wherein n is an integer ranging from 1 to 10, and wherein m is an integer ranging from 1 to 10;

(3) selected from the group consisting of bis (2-ethylhexyl phthalate) (DEHP), diisononyl phthalate (DINP), dioctyl phthalate (DNOP), diisodecyl phthalate (DIDP), dipropylheptyl phthalate (DPHP), di-2-ethylhexyl terephthalate (DOTP or DEHT) and a mixture thereof;

(4) selected from the group consisting of polyethylene glycol diacrylate, polyethylene glycol methacrylate, polyethylene glycol diepoxy, polypropylene glycol diacrylate, polypropylene glycol diacrylate, polypropylene glycol diepoxy and mixture thereof;

(5) selected from the group consisting of poly (methyl methacrylate) (PMMA), polyvinyl acetate (PVA), polyvinyl butyral (PVB), cellulose acetate butyrate (CAB) and mixture thereof; or (6) selected from the group consisting of dipropylene glycol dibenzoate (DPGDB), tripropylene glycol dibenzoate (TPGDB), diethylene glycol dibenzoate (DEGDB), triethylene glycol dibenzoate (TEGDB), and a mixture thereof.

* * * * *